(12) United States Patent
Ueda et al.

(10) Patent No.: US 12,391,827 B2
(45) Date of Patent: Aug. 19, 2025

(54) BIAXIALLY STRETCHED POLYAMIDE FILM

(71) Applicant: TOYOBO CO., LTD., Osaka (JP)

(72) Inventors: Kazushige Ueda, Inuyama (JP); Takamichi Goto, Inuyama (JP); Takuro Endo, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 468 days.

(21) Appl. No.: 17/906,313

(22) PCT Filed: Mar. 24, 2021

(86) PCT No.: PCT/JP2021/012304
§ 371 (c)(1),
(2) Date: Sep. 14, 2022

(87) PCT Pub. No.: WO2021/200489
PCT Pub. Date: Oct. 7, 2021

(65) Prior Publication Data
US 2023/0340261 A1 Oct. 26, 2023

(30) Foreign Application Priority Data

Mar. 30, 2020 (JP) ................................ 2020-060681
Jun. 4, 2020 (JP) ................................ 2020-097913
Jul. 16, 2020 (JP) ................................ 2020-122061

(51) Int. Cl.
*C08L 77/06* (2006.01)
*B32B 1/00* (2024.01)
(Continued)

(52) U.S. Cl.
CPC ................ *C08L 77/06* (2013.01); *B32B 1/00* (2013.01); *B32B 27/08* (2013.01); *B32B 27/18* (2013.01);
(Continued)

(58) Field of Classification Search
CPC .............. B65D 75/008; B65D 75/5805; B65D 81/3461; B65D 2581/3428; B65D 81/34;
(Continued)

(56) References Cited

U.S. PATENT DOCUMENTS 5,939,205 A 8/1999 Yokoyama et al.
6,294,263 B1 9/2001 Okudaira et al.
(Continued)

FOREIGN PATENT DOCUMENTS

JP H10-029264 A 2/1998
JP H11-254615 A 9/1999
(Continued)

OTHER PUBLICATIONS

English machine translation for JP2007-055159. (Year: 2007).*
(Continued)

*Primary Examiner* — Michael C Miggins
(74) *Attorney, Agent, or Firm* — Leydig, Voit & Mayer, Ltd.

(57) ABSTRACT

It is provided that a biaxially stretched polyamide film that has excellent resistance to pinhole formation due to bending, has excellent resistance to pinhole formation due to repeated contact, has excellent piercing resistance, and further can suppress generation of foreign matter during film formation. A biaxially stretched polyimide film comprising a functional layer (layer B) laminated on at least one surface of a base layer (layer A), wherein the base layer (layer A) contains at least (a) 70 to 99% by mass of a polyamide 6 resin, and (b) 1 to 20% by mass of an aliphatic or aromatic-aliphatic polyester resin, and the functional layer (layer B) contains at least 70% by mass or more of a polyamide 6 resin.

9 Claims, 1 Drawing Sheet

(51) Int. Cl.
    *B32B 27/08*     (2006.01)
    *B32B 27/18*     (2006.01)
    *B32B 27/34*     (2006.01)
    *B32B 27/36*     (2006.01)
    *B65D 65/40*     (2006.01)
    *C08J 5/18*      (2006.01)
    *C09J 7/25*      (2018.01)
    *C09J 7/38*      (2018.01)
    *C09J 177/06*    (2006.01)

(52) U.S. Cl.
    CPC .............. *B32B 27/34* (2013.01); *B32B 27/36* (2013.01); *B65D 65/40* (2013.01); *C08J 5/18* (2013.01); *C09J 7/25* (2018.01); *C09J 7/38* (2018.01); *C09J 177/06* (2013.01); *B32B 2250/24* (2013.01); *B32B 2250/40* (2013.01); *B32B 2255/10* (2013.01); *B32B 2255/26* (2013.01); *B32B 2270/00* (2013.01); *B32B 2307/414* (2013.01); *B32B 2307/518* (2013.01); *B32B 2307/54* (2013.01); *B32B 2307/558* (2013.01); *B32B 2307/581* (2013.01); *B32B 2439/06* (2013.01); *B32B 2439/70* (2013.01); *C08J 2377/06* (2013.01); *C08J 2467/02* (2013.01)

(58) Field of Classification Search
    CPC .. B65D 75/58; B65D 65/40; B32B 2250/244; B32B 3/266; B32B 27/16; B32B 2307/702; B32B 27/20; B32B 2250/04; B32B 2307/7246; B32B 27/08; B32B 27/36; B32B 7/12; B32B 1/00; B32B 2250/03; B32B 2255/10; B32B 2255/20; B32B 2439/46; B32B 2307/518; B32B 2307/31; B32B 2270/00; B32B 2439/70; B32B 2307/306; B32B 2250/24; B32B 27/34; B32B 2250/02; B32B 27/32; B32B 37/12; B32B 2307/732
    See application file for complete search history.

(56) References Cited

U.S. PATENT DOCUMENTS

| | | |
|---|---|---|
| 2007/0065673 A1 | 3/2007 | Nanba et al. |
| 2011/0200770 A1 | 8/2011 | Uehara et al. |
| 2013/0149597 A1 | 6/2013 | Suzuta et al. |
| 2017/0066228 A1 | 3/2017 | Fusarpoli et al. |
| 2020/0254741 A1 | 8/2020 | Hama et al. |
| 2020/0392298 A1 | 12/2020 | Okuzu et al. |
| 2021/0229405 A1 | 7/2021 | Nambu et al. |

FOREIGN PATENT DOCUMENTS

| | | |
|---|---|---|
| JP | 2001-205761 A | 7/2001 |
| JP | 2007-055159 A | 3/2007 |
| JP | 2007-112999 A | 5/2007 |
| JP | 2010-253711 A | 11/2010 |
| JP | 2013-154605 A | 8/2013 |
| JP | 2017-507042 A | 3/2017 |
| JP | 2019-147964 A | 9/2019 |
| WO | WO 2012/033133 A1 | 3/2012 |
| WO | WO 2019/065161 A1 | 4/2019 |
| WO | WO 2019/131752 A1 | 7/2019 |
| WO | WO 2019/230255 A1 | 12/2019 |

OTHER PUBLICATIONS

English machine translation for JP2013-154605. (Year: 2013).*
English machine translation for JP2006-015742. (Year: 2006).*
Intellectual Property India, Examination Report in Indian Patent Application No. 202247060198 (Aug. 30, 2024).
Japanese Patent Office, International Search Report in International Patent Application No. PCT/JP2021/012304 (Jun. 15, 2021).
European Patent Office, Extended European Search Report in European Patent Application No. 21778793.6 (Feb. 15, 2024).
Taiwan Intellectual Property Office, Office Action in Taiwanese Patent Application No. 110109044 (Apr. 9, 2024).
Indonesian Directorate General of Intellectual Property, Result of Stage 1 Substantive Examination in Indonesian Patent Application No. P00202210708 (May 27, 2024).
China National Intellectual Property Administration, First Office Action in Chinese Patent Application No. 202180019647.7 (May 10, 2023).
China National Intellectual Property Administration, Second Office Action in Chinese Patent Application No. 202180019647.7 (Nov. 20, 2023).
Indonesian Directorate General of Intellectual Property, Office Action in Indonesian Patent Application No. P00202210708 (Mar. 3, 2025).
Intellectual Property India, Hearing Notice in Indian Patent Application No. 202247060198 (Jan. 7, 2025).

* cited by examiner

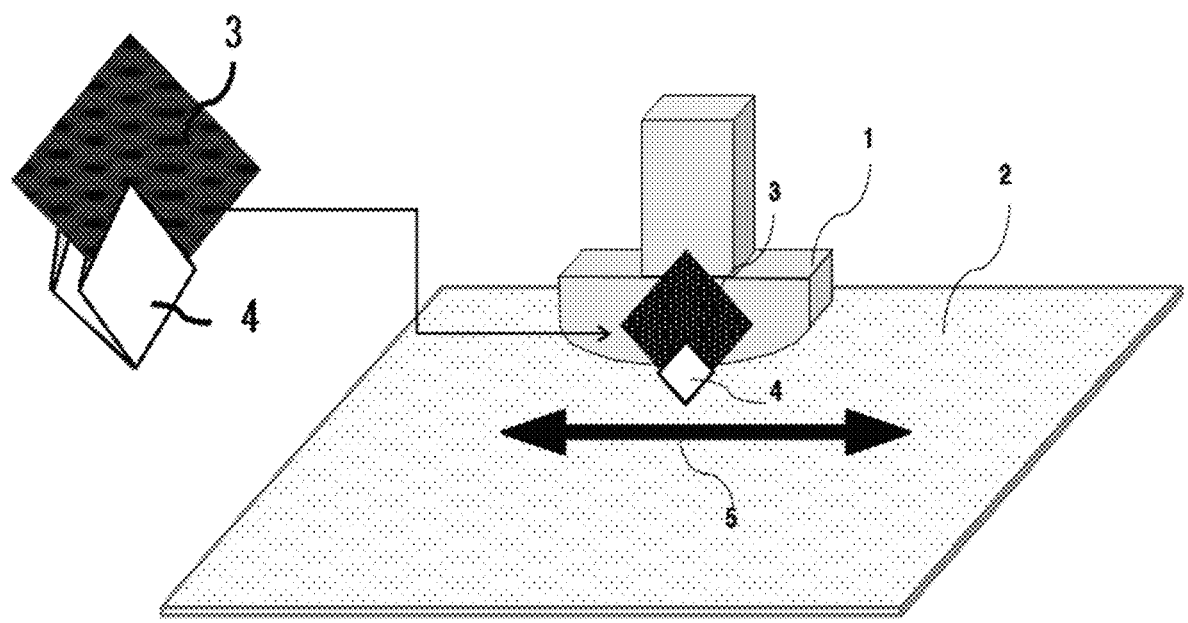

BIAXIALLY STRETCHED POLYAMIDE FILM

TECHNICAL FIELD

The present invention relates to a biaxially stretched polyamide film that has excellent impact resistance, bending pinhole resistance, and friction pinhole resistance. The biaxially stretched polyamide film of the present invention is suitably used as a film for packaging food, and the like.

BACKGROUND ART

Conventionally, a biaxially stretched film made of an aliphatic polyamide typified by polyamide 6 has excellent impact resistance and bending pinhole resistance, and has been widely used as various packaging material films.

In addition, in order to further improve bending pinhole resistance and impact resistance for filling and packaging liquids such as soups and seasonings, biaxially stretched polyamide films for which various elastomers (rubber components) are mixed with an aliphatic polyamide to make the films more flexible and improve bending pinhole resistance have been used.

A film for which a polyamide-based elastomer is mixed with an aliphatic polyamide as a means for improving the above bending pinhole resistance, has been known (see, for example, Patent Document D. This film has good bending pinhole resistance and impact resistance in a low temperature environment, and pinholes due to bending fatigue are less likely to occur even in a low temperature environment. However, in the case of a film for which a polyamide-based elastomer is mixed with an aliphatic polyamide, the polyamide-based elastomer added during film production is thermally deteriorated, so that deteriorated matter called as a die build-up is likely to be generated at the lip outlet of a die. There has been a problem that the deteriorated matter itself drops to produce a defective product, which decreases the production efficiency during continuous film production.

Pinholes occur not only due to bending but also due to friction (rubbing). The methods for addressing pinholes due to bending and pinholes due to friction often conflict with each other. For example, if the flexibility of the film is increased, bending pinholes are less likely to occur, but pinholes due to friction tends to be more likely to occur due to the increase in flexibility. On the other hand, a laminate for packaging that improve pinhole occurrence due to bending and friction by providing a surface coating agent on the outer surface of a biaxially stretched polyamide film has been proposed (see; for example, Patent Document 2). However, this method has little effect of preventing occurrence of friction pinholes. In addition, a coating step is required.

Furthermore, for example, Patent Documents 3 and 4 each disclose a stretched film made of a polyamide-based resin composition containing 1 to 10% by mass of a polyester-based thermoplastic elastomer. According to the technologies, the stretched film has excellent bending resistance even in a low-temperature environment. However, even in these technologies, since an elastomer component having low heat resistance exists in a surface layer, there is still room for improvement for the problem that deteriorated matter called as a die build-up is likely to be generated at the lip outlet of the die.

PRIOR ART DOCUMENTS

Patent Documents

Patent Document 1: JP hei-11-254615 A
Patent Document 2: JP 2001-205761 A
Patent Document 3: WO 2019/131752 A
Patent Document 4: JP 2019-147964 A
Patent Document 5: JP hei-10-29264 A

SUMMARY OF THE INVENTION

Problems to be Solved by the Invention

The present invention has been made to solve the above-described problems of the conventional art. An object of the present invention is to provide a biaxially stretched polyamide film that has excellent resistance to pinhole formation due to bending and excellent resistance to pinhole formation due to repeated contact, has excellent piercing resistance, and further can suppress generation of foreign matter during film formation. In addition to the above, another object of the present invention is to provide an easily adhesive polyamide film that has excellent water-resistant adhesive strength with a sealant film and further can suppress generation of foreign matter during film formation, or a biaxially stretched polyamide fibs having excellent gas barrier properties.

Solution to the Problems

The present invention has the following configuration.

[1] A biaxially stretched polyamide film comprising a functional layer (layer B) laminated on at least one surface of a base layer (layer A), wherein the base layer (layer A) contains at, least (a) 70 to 99% by mass of a polyamide 6 resin, and (b) 1 to 20% by mass of an aliphatic or aromatic-aliphatic polyester resin, and the functional layer (layer B) contains at least 70% by mass or more of a polyamide 6 resin.

[2] The biaxially stretched polyamide film according to the above wherein the aliphatic or aromatic-aliphatic polyester resin (b) is at least one polyester resin selected from the group consisting of polybutylene succinate, polybutylene succinate adipate, and polybutylene adipate terephthalate.

[3] The biaxially stretched polyamide film according to the above [1] or [2], wherein the base layer (layer A) contains a polyamide resin in which at least a part of raw material is derived from biomass.

[4] The biaxially stretched polyamide film according to the above [3], wherein the polyamide resin in which at least a part of the raw material is derived from biomass is at least, one polyamide resin selected from the group consisting of polyamide 11, polyamide 410, polyamide 610, and polyamide 1010.

[5] The biaxially stretched polyamide film according to any one of the above [1] to [4], wherein the biaxially stretched polyamide film satisfies the following (a) to (c):

(a) the number of bending fatigue pinholes is not larger than 5 when a bending test using a Gelbo flex tester is performed 1000 times at a temperature of 1° C., (b) a distance to occurrence of a pinhole in a friction pinhole resistance test is not smaller than 2900 cm, and (c) the film has a piercing strength of not lower than 0.67 N/μm.

[6] A biaxially stretched polyamide film comprising a coating layer on at least one surface of the biaxially stretched polyamide film according to any one of the above [1] to [5], wherein the coating layer has a solid content of 0.01 to 3 g/m², and contains one or more resins selected from the group consisting of a polyester resin, a polyurethane resin, a poly acrylic resin, and an acrylic graft copolymerized polyester resin.

[7] A polyamide film comprising an inorganic thin film layer on at least one surface of the biaxially stretched polyamide film according to any one of the above [1] to [6].

[8] A laminated film in which a sealant film is laminated on the biaxially stretched polyamide film according to any one of the above [1] to [7].

[9] A packaging bag for which the laminated film according to the above [8] is used.

Effects of the Invention

The biaxially stretched polyamide film of the present invention has excellent impact resistance, bending pinhole resistance, and friction pinhole resistance by providing a layer containing the polyamide 6 resin as a main component and blended with a specific polyester-based resin, as an inner layer of the film.

In addition, the elastomer component does not deteriorate inside a die in the film formation process, so that adhesion of deteriorated matter to the inner surface of the die and adhesion of a die build-up to the lip outlet of the die can be suppressed over a long time. The thickness unevenness of the film caused by adhesion of deteriorated matter to the inner surface of the die or the lip outlet of the the can be reduced. Moreover, the number of times to stop the production and clean the lip of the die can be reduced, so that continuous production for a long time is enabled.

BRIEF DESCRIPTION OF THE DRAWING

FIG. 1 is a schematic diagram of a friction pinhole resistance evaluation device.

DESCRIPTION OF EMBODIMENTS

Hereinafter, the biaxially stretched polyamide film of the present invention will be described in detail. The biaxially stretched polyamide film of the present invention is a biaxially stretched polyamide film in which a functional layer (layer B) is laminated on at least one surface of a base layer (layer A). Hereinafter, each layer will be described in detail.

The base layer (layer A) comprises a resin composition containing at least (a) 70 to 99% by mass of a polyamide 6 resin, and (b) 1 to 20% by mass of an aliphatic or aromatic-aliphatic polyester resin.

By containing 70% by mass or more of polyamide 6 resin in the base material layer (layer A), a biaxially stretched polyamide film having excellent mechanical strength such as impact strength and gas barrier property such as oxygen can be obtained.

Polyamide 6 resin used for the base layer (layer A) is normally produced by ring-opening polymerization of ε-caprolactam. Polyamide 6 resin obtained by ring-opening polymerization is usually treated with hot water to remove lactam monomer, and then the polyamide 6 is melt extruded from an extruder after dried.

Relative viscosity of polyamide 6 is preferably 1.8 to 4.5, and more preferably 2.6 to 3.2. When the relative viscosity is smaller than 1.8, film has insufficient impact strength. With the relative viscosity larger than 4.5, an unstretched film before stretching becomes hard to be obtained because of the increased load to an extruder.

When the base layer (layer A) contains 1 to 20% by mass of the aliphatic or aromatic-aliphatic polyester resin, a biaxially stretched polyamide film having excellent bending pinhole resistance is obtained. As the aliphatic or aromatic-aliphatic polyester resin contained in the base layer (layer A), a resin having a glass transition temperature (Tg) of minus 30° C. or lower is preferable. By using a polyester copolymer having a glass transition temperature of minus 30° C. or lower, excellent pinhole resistance can be exhibited even in a freezing environment. Among them, polybutylene succinate and polybutylene succinate adipate are preferable as the aliphatic polyester resin, and polybutylene adipate terephthalate is preferable as the aromatic-aliphatic polyester resin, since these resins have flexible properties.

The lower limit of the aliphatic or aromatic-aliphatic polyester resin contained in the base layer (layer A) is preferably 1% by mass, further preferably 2% by mass, and most preferably 3% by mass. If the addition amount of the aliphatic or aromatic-aliphatic polyester resin contained in the base layer (layer A) is smaller than 1% by mass, the effect of improving bending pinhole resistance is not obtained. The upper limit of the aliphatic or aromatic-aliphatic polyester resin contained in the base layer (layer A) is preferably 20% by mass and more preferably 1.5% by mass. If the addition amount of the aliphatic or aromatic-aliphatic polyester resin contained in the base layer (layer A) exceeds 20% by mass, the film becomes excessively flexible, the piercing strength and the impact strength are decreased, and the film is also easily stretched, so that deviation in pitch shift during processing such as printing is likely to occur.

When the base layer (layer A) further contains a specific polyamide resin containing a raw material derived from biomass, the bending pinhole resistance can be further improved. The upper limit of the content of the polyamide resin in which at least a part of raw material is derived from biomass and which is contained in the base layer (layer A), is 30% by mass and more preferably 20% by mass. If the content of the polyamide resin in which at least a part of raw material is derived from biomass exceeds 30% by mass, a melted film becomes unstable when the melted film is cast, so that it becomes difficult to obtain a homogeneous unstretched film.

Examples of the polyamide resin in which at least a part of raw material is derived from biomass and which can be used in the base layer (layer A) include polyamide 11, polyamide 610, polyamide 1010, and polyamide 410 in terms of availability.

The above polyamide 11 is a polyamide resin having a structure in which a monomer having 11 carbon atoms is bonded via an amide bond. Polyamide 11 is usually obtained using aminoundecanoic acid or undecane lactam as a monomer. In particular, aminoundecanoic acid is preferable from the viewpoint of environmental protection (particularly from the viewpoint of carbon neutrality) since aminoundecanoic acid is a monomer obtained from castor oil. The proportion of the structural units derived from these monomers having 11 carbon atoms is preferably not less than 50%, and may be 100%, of the structural units in the polyamide 11. The above polyamide 11 is normally produced by ring-opening polymerization of the above undecane lactam. The polyamide 11 obtained by ring-opening polymerization is normally dried and then melt-extruded by an extruder after lactam monomer is removed with hot water. Relative viscosity of polyamide 11 is preferably 1.8 to 4.5, and more preferably 2.4 to 3.2.

When the relative viscosity is smaller than 1.8, film has insufficient impact strength. With the relative viscosity larger than 4.5, an unstretched film before stretching becomes hard to be obtained because of the increased load to an extruder.

The polyamide 610 is a polyamide resin having a structure in which a monomer having 6 carbon atoms and a monomer having 10 carbon atoms are bonded via an amide bond. Polyamide 610 is usually obtained through copolymerization of a diamine and a dicarboxylic acid, and hexamethylene diamine and sebacic acid are used, respectively. Sebacic acid is preferable from the viewpoint of environmental protection (particularly from the viewpoint of carbon neutrality) since sebacic acid is a monomer obtained from castor oil. The total proportion of the structural unit derived from the monomer having 6 carbon atoms and the structural unit derived from the monomer having 10 carbon atoms is preferably not less than 50% of all the structural carbon in the polyamide 610, and may be 100% of all the structural carbon in the polyamide 610.

The polyamide 1010 is a polyamide resin having a structure in which a diamine having 10 carbon atoms and a dicarboxylic acid having 10 carbon atoms are copolymerized, Usually, 1,10-Decanediamine (Decamethylenediamine) and sebacic acid are used for the polyamide 1010. Decamethylenediamine and sebacic acid are preferable from the viewpoint of environmental protection (particularly from the viewpoint of carbon neutrality) since decamethylenediamine and sebacic acid are monomers obtained from castor oil. The total proportion of the structural units derived from the diamine having 10 carbon atoms and the structural units derived from the dicarboxylic acid having 10 carbon atoms is preferably not less than 50% of all the structural units in the polyamide 1010, and may be 100% of the structural units in the polyamide 1010.

The above polyamide 410 is a polyamide resin having a structure in which a monomer having 4 carbon atoms and a diamine having 10 carbon atoms are copolymerized. Usually, sebacic acid and tetramethylenediamine are used for the polyamide 410. As sebacic acid, one produced from castor oil derived from a vegetable oil, is preferable from an environmental point of view. As the sebacic acid used here, one obtained from castor oil is desirable from the viewpoint of environmental protection (particularly from the viewpoint of carbon neutrality).

The base layer (layer A) in the present invention can contain various additives such as another thermoplastic resin, a lubricant, a heat stabilizer, an antioxidant, an antistatic agent, an antifogging agent, a UV absorber, a dye, and a pigment, as necessary.

The base layer (layer A) in the present invention can contain thermoplastic resins other than polyamide 6 as long as the object of the present invention is not impaired. Examples of the thermoplastic resins include polyamide-based resins such as a polyamide 12 resin, a polyamide 66 resin, a polyamide 6/12 copolymer resin, a polyamide 6/66 copolymer resin, a polyamide MXD6 resin, a polyamide MXD10 resin, and a polyamide 11/6T copolymer resin.

A thermoplastic resin other than polyamide-based resins, for example, a polyester-based polymer such as polyethylene terephthalate, polybutylene terephthalate, and polyethylene-2,6-naphthalate, a polyolefin-based polymer such as polyethylene and polypropylene, or the like may be contained as necessary.

[Functional Layer (Layer B)]

The layer B contains 70% to 100% by mass of a polyamide 6 resin.

By containing 70% by mass or more of the polyamide 6 resin in the functional layer (layer B), a biaxially stretched polyamide film having excellent mechanical strength such as impact strength and excellent gas barrier properties such as for oxygen can be obtained. As the polyamide 6 resin, one that is the same as the polyamide 6 resin used for the above base layer (layer A) can be used.

The functional layer (layer B) can contain various additives such as another thermoplastic resin, a lubricant, a heat stabilizer, an antioxidant, an antistatic agent, an antifogging agent, a UV absorber, a dye, and a pigment, depending on the function to be provided to the surface of the functional layer (layer B). In the case where the functional layer (layer B) is used on the outer side of a packaging bag, friction pinhole resistance is required, so that it is not preferable to contain a flexible resin such as a polyamide-based elastomer or a polyolefin-based elastomer, or a substance that causes a large number of voids.

The functional layer (layer B) can contain thermoplastic resins other than polyamide 6 as long as the object of the present invention is not impaired. Examples of the thermoplastic resins include polyamide-based resins such as a polyamide MXD6 resin, a polyamide 11 resin, a polyamide 12 resin, a polyamide 66 resin, a polyamide 6/12 copolymer resin, and a polyamide 6/66 copolymer resin. A thermoplastic resin other than polyamide-based resins, for example, a polyester-based polymer such as polyethylene terephthalate, polybutylene terephthalate, and polyethylene-2,6-naphthalate, a polyolefin-based polymer such as polyethylene and polypropylene, or the like may be contained as necessary.

The functional layer (layer B) preferably contains fine particles, an organic lubricant, or the like as a lubricant in order to improve the slipperiness of the film.

By improving the slipperiness, the handleability of the film is improved and breakage of the packaging bag due to rubbing is reduced.

The fine particles can be arbitrarily selected from inorganic fine particles such as silica, kaolin, and zeolite, or an organic fine particles such as acrylic-based or polyethylene-based. Silica fine particles are preferably used in terms of transparency and slipperiness.

The average particle diameter of the fine particles is preferably 0.5 to 5.0 µm, and more preferably 1.0 to 3.0 µm. When the average particle diameter is less than 0.5 µm, adding large amount of the particles are required to achieve good slipperiness. When the diameter is larger than 5.0 µm, surface of the film tends to become too rough, and appearance of the film tends to become worse, When silica fine particles are used, the pore volume of silica fine particles are preferably 0.5 to 2.0 ml/g, and more preferably 0.8 to 1.6 ml/g. When the pore volume is less than 0.5 ml/g, void are likely to occur, and transparency of the film becomes worse. When the pore volume is larger than 2.0 ml/g, surface protrusions due to the fine particles tends to be less likely to be generated.

Fatty acid amide and/or fatty acid bisamide may be contained as the organic lubricant. Examples of the fatty acid amide and/or fatty acid bisamide are erucic acid amide, stearic acid amide, ethylene bisstearic acid amide, ethylene bisbehenic acid amide, and ethylene bisoleic acid amide. When the fatty acid amide and/or the fatty acid bisamide is contained, the content amount to be added in the functional layer (Layer B) to is preferably 0.01 to 0.40 mass %, and more preferably 0.05 to 0.30 mass %. When the content amount of the fatty acid amide and/or the fatty acid bisamide is less than the above range, slipperiness of the film tends to be poor. When the amount exceeds the above range, wettability of the film tends to be poor.

A polyamide-based resin other than polyamide 6, for example, a polyamide MXD6 resin, polyamide 11, a polyamide 12 resin, a polyamide 66 resin, a polyamide 6/12 copolymer resin, a polyamide 6/66 copolymer resin, or the like, can be added to the functional layer (layer B) for the purpose of improving the slipperiness of the film. A polyamide MXD6 resin is particularly preferable, and is preferably added in an amount of 1 to 10% by mass. If the amount of the polyamide-based resin is less than 1% by mass, the effect of improving the slipperiness of the film is small. If the amount of the polyamide-based resin is larger than 10% by mass, the effect of improving the slipperiness of the film is saturated.

A polyamide MXD6 resin is produced by polycondensation of m-xylylenediamine and adipic acid. The relative viscosity of the polyarnide MXD6 is preferably 1.8 to 4.5 and more preferably 2.0 to 3.2. If the relative viscosity is lower than 1.8 or if the relative viscosity is higher than 4.5, it may be difficult to perform kneading with the polyamide resin by the extruder.

A polyamide-based resin other than polyamide 6 can also be added to the functional layer (layer B) for the purpose of improving adhesiveness. In this case, a copolymerized polyamide resin such as a polyamide 6/12 copolymer resin and a polyamide 6/66 copolymer resin is preferable.

As for the method for adding auxiliary materials and additives such as a lubricant and an antioxidant to the base layer (layer A) and the functional layer (layer B) of the biaxially stretched polyamide film in the present invention, the auxiliary materials and the additives can be added at the time of resin polymerization or at the time of melt-extrusion with the extruder. A high concentration masterbatch may be prepared, and may be added to the polyamide resin at the time of film production. The addition can be performed by such a known method.

The thickness of the biaxially stretched polyarnide film in the present invention is not particularly limited, but when the biaxially stretched polyamide film is used as a packaging material, the thickness is usually not thicker than 100 μm, one having a thickness of 5 to 50 μm is generally used, and one having a thickness of 8 to 30 μm is particularly used.

In the thickness configuration of the base layer (layer A) and the functional layer (layer B) in the biaxially stretched polyamide film of the present invention, if the thickness of the functional layer (layer B) occupies a large part of the total thickness of the film, the bending pinhole resistance is decreased. Therefore, in the present invention, the thickness of the base layer (layer A) is preferably 50 to 93% and particularly preferably 60 to 93% of the total thickness of the base layer (layer A) and the functional layer (layer B).

In the case where the polyamide resin in which at least a part of raw material is derived from biomass is used for the biaxially stretched polyamide film of the present invention, the content of carbon derived from biomass as measured with radiocarbon (C14) is preferably 1 to 15% with respect to total carbon in the polyamide film.

For the biaxially stretched polyamide film of the present invention, the number of pinhole defects by a measurement method described in Examples is preferably not larger than 5 when a torsional bending test using a Gelbo flex tester is performed 1000 times at a temperature of 1° C. The number of pinhole defects is more preferably not larger than 3. The smaller the number of pinhole defects after the bending test, the better the bending pinhole resistance. If the number of pinholes is not larger than 5, a packaging bag in which pinholes are less likely to occur even when a load is applied to the packaging bag during transportation or the like, is obtained.

Furthermore, for the biaxially stretched polyamide film of the present invention, the distance to occurrence of a pinhole in a friction pinhole resistance test according to the measurement method described in the examples is not less than. 2900 cm. The distance is more preferably not less than 3100 cm and further preferably not less than 3300 cm. The longer the distance to occurrence of a pinhole, the better the friction pinhole resistance. If the distance to occurrence of a pinhole is not less than 2900 cm, a packaging bag in which pinholes are less likely to occur even when the packaging bag rubs against a cardboard box during transportation or the like, is obtained.

The biaxially stretched polyamide film of the present invention is characterized by having excellent characteristics of the above bending pinhole resistance and friction pinhole resistance. The biaxially stretched polyamide film of the present invention having these characteristics is very useful as a packaging film since pinholes are less likely to occur in the biaxially stretched polyamide film during transportation.

The heat shrinkage rate of the film of the present invention at 160° C. for 10 minutes is in the range of preferably 0.6 to 3.0% and more preferably 0.6 to 2.5% in both the machine direction (hereinafter abbreviated as MD direction) and the transverse direction (hereinafter abbreviated as TI) direction). If the heat shrinkage rate exceeds 3.0%, curling or shrinkage may occur when heat is applied in the next process such as lamination or printing. In addition, the lamination strength with a sealant film may be weakened. Although it is possible to set the heat shrinkage rate to be less than 0.6%, the film may become mechanically brittle. In addition, the productivity may be deteriorated.

Since having excellent impact resistance is a feature of the biaxially stretched polyamide film, the impact strength of the biaxially stretched polyamide film of the present invention is preferably not less than 0.7 J/15 μm and more preferably not less than 0.9 J/15 μm.

The piercing strength of the film of the present invention is preferably not lower than 0.67 N/μm. By setting the piercing strength to be not lower than 0.67 N/μm, even when a bag is filled with solid contents or the like, the hag can be inhibited from being punctured by the contents piercing the bag, or by an external factor during transportation.

The haze value of the biaxially stretched polyamide film of the present invention is preferably not higher than 10%, more preferably not larger than 7%, and further preferably not larger than 5%. If the haze value is small, the transparency and gloss are good. Thus, when the biaxially stretched polyamide film is used for a packaging bag, beautiful printing is enabled to increase the commercial value. If fine particles are added in order to improve the slipperiness of the film, the haze value is increased, so that the haze value can be made smaller when the fine particles are added to only the functional layer (layer B) which is a surface layer.

It is preferable that the biaxially stretched polyamide film of the present invention has a lamination strength of not less than 4.0 N/15 mm after being attached to a polyethylene-based sealant film described in Examples. The biaxially stretched polyamide film of the present invention is usually laminated with a sealant film and then processed into a packaging bag. If the above lamination strength is not less than 4.0 N/15 mm, when a packaging bag is produced using the biaxially stretched polyamide film of the present invention in various lamination configurations, sufficient strength of a sealed portion is obtained, and a packaging bag that is less likely to be torn is obtained. In order to make the lamination strength to be not less than 4.0 N/15 mm, a corona treatment, a coating treatment, a flame treatment, or the like can be performed on the biaxially stretched polyamide film of the present invention.

[Method for Manufacturing Biaxially Stretched Polyamide Film]

The biaxially stretched polyamide film in the present invention can be manufactured using known production methods. Examples of method for producing the biaxially stretched polyamide film are a sequential biaxial stretching method and a simultaneous biaxial stretching method. The sequential biaxial stretching method is preferable since the sequential biaxial stretching method is capable of increasing a film manufacturing speed, and therefore, has an advantage in terms of cost.

A method for manufacturing the biaxially stretched film of the present invention will be described below.

At first, a resin raw material is melt extruded using an extruder and is extruded from a T-die in the form of a film. Then, the extruded resin is cast on a cooling roll to be cooled, and an unstretched film is obtained. In the present invention, in order to obtain an unstretched film in which the base layer (layer A) and the functional layer (layer B) are laminated, a co-extrusion method using a feed block, a multi-manifold, or the like is preferable. In addition to the co-extrusion method, a dry lamination method, an extrusion lamination method, or the like can also be selected. When lamination is performed by the co-extrusion method, polyamide resin composition to be used for the base layer (layer A) and the functional layer (layer B) is preferably such that the difference between the melt, viscosities of the base layer (layer A) and the functional layer (layer B) is reduced.

A melting temperature of resin is preferably 220 to 350° C. When the temperature is lower than the above, unmelted material or the like are generated, and poor appearance such as defect may be occurred. When the temperature is higher than the above, deterioration of resin or the like is observed, and reduction of molecular weight and deterioration in an appearance may be generated. The temperature of a die is preferably 250 to 350° C. A temperature of the cooling roll is preferably −30 to 80° C., further preferably 0 to 50° C. In order to obtain the unstretched film by casting film-shaped molten material extruded from the T-die onto a cooling rotating drum and cooling it, the method using an air knife, the electrostatic adhesion method by applying static charge, or the like is preferably employed. In particular, the latter method is preferably used. The opposite side of the casted unstretched film onto the cooling roll is preferably cooled. For example, it is preferable to use a combination of the following methods: a method of contacting the opposite side of the unstretched film onto the cooling roll with the cooling liquid in the vessel; a method of applying an evaporating liquid to the opposite side of the unstretched film onto the cooling roll with a spray nozzle; method of cooling the unstretched film by spraying high-speed fluid on the opposite side of the unstretched film onto the cooling roll, and the like. The unstretched film obtained in this way is biaxially stretched to obtain the biaxially stretched polyamide film of the present invention.

Stretching method may be either a simultaneous biaxial stretching method or a sequential biaxial stretching method. The sequential biaxial stretching method is preferable since the sequential biaxial stretching method is capable of increasing a film manufacturing speed, and therefore, has an advantage in terms of cost. In both cases, as a method of stretching in an MD direction, one-stage stretching or multi-stage stretching such as two-stage stretching can be used. As will be described later, multi-stage stretching in the MD direction such as two-stage stretching, rather than one-stage stretching, is preferable in terms of physical properties and uniformity (isotropy) of physical properties in the MD direction and a TD direction. The stretching in the MD direction in the sequential biaxial stretching method is preferably roll stretching.

The lower limit of the stretching temperature in the MD direction is preferably 50° C., more preferably 55° C., and further preferably 60° C. If the stretching temperature is less than 50° C., the resin does not soften and stretching may become difficult. The upper limit of the stretching temperature in the MD direction is preferably 120° C., more preferably 115° C., and further preferably 110° C. If the stretching temperature exceeds 120° C., the resin becomes too soft and stable stretching may not be possible.

The lower limit of the stretching ratio in the MD direction (in the case where stretching is performed in multiple stages, the total stretching ratio obtained by multiplying each ratio) is preferably 2.2 times, more preferably 2.5 times, and further preferably 2.8 times. If the stretching ratio is less than 2.2 times, the thickness accuracy in the MD direction may be decreased, and the degree of crystallinity may become excessively low, decreasing the impact strength. The upper limit of the stretching ratio in the MD direction is preferably 5.0 times, more preferably 4.5 times, and most preferably 4.0 times. If the stretching ratio exceeds 5.0 times, subsequent stretching may become difficult.

In the case where the stretching in the MD direction is performed in multiple stages, the above-described stretching is possible as each stretching, but as for the stretching ratio, it is necessary to adjust the stretching ratio such that the product of all the stretching ratios in the MD direction is not larger than 5.0. For example, in the case of two-stage stretching, preferably, the first-stage stretching is performed at 1.5 to 2.1 times, and the second-stage stretching is performed at 1.5 to 1.8 times.

The film stretched in the MD direction is stretched in the TD direction with a tenter, is heat-set, and is subjected to a relaxing treatment (also referred to as relaxation treatment). The lower limit, of the stretching temperature in the TD direction is preferably 50° C., more preferably 55° C., and further preferably 60° C. If the stretching temperature is less than 50° C., the resin does not soften and stretching may become difficult. The upper limit of the stretching temperature in the TD direction is preferably 190° C., more preferably 185° C., and further preferably 180° C. If the stretching temperature exceeds 190° C., crystallization may occur and stretching may be difficult.

The lower limit of the stretching ratio in the TD direction (in the case where stretching is performed in multiple stages, the total stretching ratio obtained by multiplying each ratio) is preferably 2.8, more preferably 3.2 times, further preferably 3.5 times, and particularly preferably 3.8 times. If the stretching ratio is less than 2.8, the thickness accuracy in the TD direction may be decreased, and the degree of crystallinity may become excessively low, decreasing the impact strength. The upper limit of the stretching ratio in the TD direction is preferably 5.5 times, more preferably 5.0 times, further preferably 4.7, particularly preferably 4.5, and most preferably 4.3 times. If the stretching ratio exceeds 5.5 times, the productivity may be decreased significantly.

The selection of the heat-setting temperature is an important factor in the present invention. As the heat-setting temperature is increased, crystallization and orientation relaxation of the film proceed, so that the impact strength can be improved and the heat shrinkage rate can be reduced. On the other hand, if the heat-setting temperature is low, the crystallization and orientation relaxation are insufficient, so that the heat shrinkage rate cannot be sufficiently reduced. In addition, if the heat-setting temperature becomes excessively high, deterioration of the resin proceeds, so that the toughness of the film such as impact strength is rapidly lost.

The lower limit of the heat-setting temperature is preferably 210° C. and more preferably 212° C. If the heat-setting temperature is low, the heat shrinkage rate becomes excessively high, so that the appearance after lamination tends to be deteriorated, and the lamination strength tends to be decreased. The upper limit of the heat-setting temperature is preferably 220° C. and more preferably 218° C. if the heat-setting temperature is excessively high, the impact strength tends to be decreased. The heat-setting time is preferably 0.5 to 20 seconds, and is further preferably 1 to 15 seconds. The heat-setting time can be set to an appropriate time in consideration of the heat-setting temperature and a wind speed in a heat-setting zone. If the heat-setting conditions are excessively weak, the crystallization and orientation relaxation become insufficient, and the above problems arise. If the heat-setting conditions are excessively strong, the film toughness is decreased.

Performing a relaxing treatment after the heat-setting treatment is effective for controlling the heat shrinkage rate. The temperature for the relaxing treatment can be selected in the range from the heat-setting treatment temperature to Tg of the resin, but is preferably heat-setting treatment temperature −10° C. to Tg+10° C. If the relaxing temperature is excessively high, the shrinkage speed is excessively fast, causing distortion, etc., so that such a relaxing temperature is not preferable. On the other hand, if the relaxing temperature is excessively low, the relaxing treatment is not successfully performed, and mere relaxation occurs, so that the heat shrinkage rate is not decreased and the dimensional stability is deteriorated. The lower limit of the relaxing rate of the relaxing treatment is preferably 0.5% and more preferably 1%. If the relaxing rate is less than 0.5%, the heat shrinkage rate is not sufficiently decreased in some cases. The upper limit of the relaxing rate is preferably 20%, more preferably 15%, and further preferably 10%. If the relaxing rate exceeds 20%, sagging may occur in the tenter and the production may become difficult.

Furthermore, in order to improve dimensional stability depending on the application, it is possible to perform a heat treatment or a humidity control treatment on the biaxially stretched poly-amide film of the present invention. In addition, it is also possible to perform a corona treatment, a coating treatment, a flame treatment, or the like in order to make the film surface have good adhesiveness, and perform printing processing or vapor deposition of a metal material, an inorganic oxide, or the like thereon.

[Coating Layer (C)]

Another aspect of the biaxially oriented polyamide film is a film having a coating layer (C) on at least one side of the biaxially oriented polyester film to impart easily adhesive property. The coating layer (C) may have a solid content of 0.01 to 3 g/m², and may contain one or more resins selected from the group consisting of a polyester resin, a polyurethane resin, a polyacrylic resin, and an acrylic graft copolymerized polyester resin. The coating layer (C) is preferably provided by coating and drying a coating liquid before the film is wound as a mill roll in a film manufacturing process. The coating liquid can be coated on an unstretched film, a uniaxially stretched film, and/or a biaxially stretched film. In the case of manufacturing the film by a sequential biaxial stretch method, the coating liquid is ordinarily coated and dried on a uniaxially stretched film. In the case of manufacturing the film by simultaneous biaxial stretch, the coating liquid is ordinarily coated and dried on a stretched film with no axially stretching.

As the coating layer (C) in the present invention, since the coating liquid for the providing is coated and dried before the film is wound as a mill roll in a film manufacturing process to provide a coating film, a water-based dispersion of a resin is preferably used as the coating liquid in order to ensure safety and hygiene in manufacturing.

<Polyester Resin Used for Coating Layer (C)>

In the case of using a polyacrylic resin for the coating layer (C), a copolymerized polyester-based resin can be selected as the polyester resin. The copolymerized polyester-based resin refers to a poly condensate of a dicarboxylic acid component, a diol component, and another ester forming component. Examples of the dicarboxylic acid component contained as a component in the copolymerized polyester-based resin can include: aromatic dicarboxylic acids such as terephthalic acid, isophthalic acid, 2,6-naphthalenedicarboxylic acid, 4,4'-biphenylenedicarboxylic acid, and 5-sodium sulfoisophthalic acid; aliphatic dicarboxylic acids such as succinic acid, adipic acid, azelaic acid, and sebacic acid; alicyclic dicarboxylic acids such as 1,4-cyclohexanedicarboxylic acid and 1,2-cyclohexanedicarboxylic acid; unsaturated dicarboxylic acids such as maleic acid, fumaric acid, and tetrahydrophthalic acid; and the like.

Besides the above-described dicarboxylic acid components, salts of 5-sulfoisophthalic acid, sulfoterephthalic acid, 4-sulfoisophthalic acid, 4-sulfonaphthalene-2,6-dicarboxylic acid, and 5(4-sulfophenoxy)isophthalic acid can be used to impart water dispersibility. Among them, 5-sodium sulfoisophthalic acid is preferably used within a range of 1 to 10 mol %.

Examples of the diol component contained in the copolymerized polyester-based resin can include: aliphatic diols such as ethylene glycol, diethylene glycol, propylene glycol, 1,3-propanediol, 1,4-butanediol, neopentyl 1,6-hexanediol, and polyethylene glycol; alicyclic diols such as 1,4-cyclohexane dimethanol; aromatic diols such as 4,4'-bis(hydroxyethyl)bisphenol A; further, bis(polyoxyethylene glycol)bisphenol ether; and the like.

<Polyurethane Resin Used for Coating Layer>

In the case of using a polyurethane resin for the coating layer (C), examples of the polyurethane resin include polyurethane resins each obtained by reacting a polyol having two or more active hydrogen atoms and an organic polyisocyanate with each other.

Examples of the polyol can include: saturated polyester polyols; polyether polyols (for example, polyethylene glycol, polytetramethylene glycol, and the like); amino alcohols (for example, ethanolamine, diethanolamine, triethanolamine, and the like); and polyols having unsaturated double bonds, such as unsaturated polyester polyols (for example, unsaturated polyester polyols each obtained by polycondensation of: an unsaturated polycarboxylic acid alone or a mixture of the unsaturated polycarboxylic acid and a saturated polycarboxylic acid, and a mixture of a saturated polyhydric alcohol and an unsaturated polyhydric alcohol), polybutadiene polyols (for example, 1,2-polybutadiene polyol, 1,4-polybutadiene polyol, and the like), and acrylic polyols (acrylic polyols each obtained by copolymerization of any kind of acrylic-based monomer and an acrylic acid-based monomer with a hydroxyl group, and having the hydroxyl group in a side chain of the acrylic polyol).

Examples of the organic polyisocyanate can include: aromatic polyisocyanates (for example, diphenylmethane diisocyanate, toluene diisocyanate, and the like); aliphatic polyisocyanates (for example, hexamethylene diisocyanate and the like); alicyclic polyisocyanates (for example, isophorone diisocyanate and the like); aromatic aliphatic polyisocyanates (for example, xylylene diisocyanate); and further, polyisocyanates obtained by reacting these isocyanates and low-molecular-weight polyols with each other in advance.

<Polyacrylic Resin Used for Coating Layer>

In the case of using a polyacrylic resin for the coating layer (C), examples of the polyacrylic resin include an acrylic polymer obtained by polymerizing acrylic acid, methacrylic acid; or a salt or an ester thereof.

Examples of the acrylic acid ester-based monomer and the methacrylic acid ester-based monomer can include methyl acrylate, ethyl acrylate, butyl acrylate, 2-ethylhexyl acrylate, 2-hydroxyethyl acrylate, glycidyl acrylate, methyl methacrylate, ethyl methacrylate, butyl methacrylate, 2-ethylhexyl methacrylate, 2-hydroxyethyl methacrylate, glycidyl methacrylate; and the like. Examples of the acrylic acid salt and the methacrylic acid salt include sodium acrylate, sodium methacrylate, potassium acrylate, potassium methacrylate, ammonium acrylate, ammonium methacrylate, and the like.

Besides these essential components, an acrylic acid-based monomer such as acrylamide, methacrylamide, aminoethyl methacrylate, aminomethyl methacrylate, N-methylolacrylamide, or N-methoxymethylacrylamide may be added.

Besides them, a monomer such as vinyl chloride, vinyl acetate, styrene, vinyl ether, butadiene, isoprene, or sodium vinyl sulfonate can also be used as a copolymerization component for the polyacrylic resin. It is noted that a hydrophilic component such as an acrylic acid salt component, a methacrylic acid salt component, an acrylic acid component, an acrylamide component, a 2-hydroxyethyl acrylate component, or an N-methylolacrylamide component is preferably contained as a copolymerization component in the acrylic polymer in order to improve the functionality of the coating film. Further, the acrylic polymer may be a copolymer that has a functional group in a side chain of the molecule. The acrylic-based polymer can be obtained also by: using a hard component such as methyl methacrylate or ethyl methacrylate as a main component; and copolymerizing a soft component such as an acrylic acid ester as a copolymerization component with the hard component.

<Acrylic Graft Copolymerized Polyester Resin Used for Coating Layer>

An acrylic graft copolymerized polyester resin can be used as the coating layer (C). As the coating layer (C), an acrylic graft copolymerized polyester water-based dispersion is a preferred example in the present invention. The acrylic graft copolymerized polyester water-based dispersion contains: particles of a grafted polyester; and water, a water-based solvent, or an organic solvent. The dispersion has an appearance that ranges from translucence to milky white. The grafted polyester has: a main chain formed of a polyester; and a graft moiety (side chain) formed by a polymer of radically polymerizable monomers including a radically polymerizable monomer that has a hydrophilic group.

The average particle diameter of the particles of the grafted polyester in the acrylic graft copolymerized polyester water-based dispersion measured by a laser light scattering method, is not larger than 500 nm, preferably 10 nm to 500 nm, and more preferably 10 nm to 300 nm. If the average particle diameter is larger than 500 nm, the strength of the coating film having been coated decreases.

The amount of the particles of the acrylic graft copolymerized polyester contained in the acrylic graft copolymerized polyester water-based dispersion is ordinarily 1% by mass to 50% by mass and preferably 3% by mass to 30% by mass.

The particles in the acrylic graft copolymerized polyester water-based dispersion that can be used in the present invention can have, in the aqueous dispersion medium, a core-shell structure in which the polyester main chain serves as a core.

A coating film obtained from the above-described acrylic graft copolymerized polyester water-based dispersion has very excellent adhesiveness to the polyamide filial. Further, the coating film has very excellent blocking resistance and thus can be used, without any problems, on a film base material that has a relatively low glass transition point. In addition, in the case of obtaining a layered product, the coating film also has very favorable adhesiveness to an adhesive used when a printing ink or a sealant layer is stacked. The obtained layered film (referred to also as a laminate film) can have significantly improved durability against retorting treatment and treatment with boiling water. Furthermore, if a flexible grafted polyester in which the glass transition temperature of the grafted polyester in the copolymerized polyester water-based dispersion is not higher than 30° C. and preferably not higher than 10° C. is used, the durability of the layered product is further improved.

(Polyester Main Chain of Acrylic Graft Copolymerized Polyester)

In the present invention, the polyester that can be used as the main chain of the grafted polyester is preferably a saturated or unsaturated polyester synthesized from at least a dicarboxylic acid component and a diol component. The obtained polyester can be one type of polymer or a mixture of two or more types of polymers. A polyester that itself is intrinsically not dispersed or dissolved in water, is preferable. The weight-average molecular weight of the polyester that can be used in the present invention is 5000 to 100000 and preferably 5000 to 50000. If the weight-average molecular weight is lower than 5000, coating film physical properties such as the post-processability of a dried coating film decrease. In addition, if the weight-average molecular weight is lower than 5000, the polyester serving as the main chain is itself easily dissolved in water, and thus the formed grafted polyester cannot form the core-shell structure described later. Meanwhile, if the weight-average molecular weight of the polyester is higher than 100000, dispersion in water becomes difficult. Thus, the weight-average molecular weight is preferably not higher than 100000 from the viewpoint of dispersion in water. The glass transition point of the polyester is not higher than 30° C. and preferably not higher than 10° C.

The above-described dicarboxylic acid component is preferably a dicarboxylic acid mixture that contains at least one type of aromatic dicarboxylic acid, at least one type of aliphatic and/or alicyclic dicarboxylic acid, and at least one type of dicarboxylic acid having a radically polymerizable unsaturated double bond.

As the aromatic dicarboxylic acid, terephthalic acid, isophthalic acid, orthophthalic acid, naphthalenedicarboxylic acid, biphenyldicarboxylic acid, and the like can be used. Further, 5-sodium sulfoisophthalic acid can also be used as necessary.

As the aliphatic dicarboxylic acid, succinic acid, adipic acid, azelaic acid, sebacic acid, dodecanedioic acid, dimer acid, acid anhydrides thereof, and the like can be used.

As the alicyclic dicarboxylic acid, 1,4-cyclohexanedicarboxylic acid, 1,3-cyclohexanedicarhoxylic acid, 1,2-cyclohexanedicarboxylic acid, acid anhydrides thereof, and the like can be used.

As the dicarboxylic acid containing a radically polymerizable unsaturated double bond, fumaric acid, maleic acid, maleic acid anhydride, itaconic acid, and citraconic acid can be used as α,β-unsaturated dicarboxylic acids, and 2,5-norbornene dicarboxylic acid anhydride, tetrahydrophthalic acid anhydride, and the like can be used as alicyclic dicarboxylic acids containing an unsaturated double bond. Among them, fumaric acid, maleic acid, and 2,5-norbornene dicarboxylic acid (end-bicyclo-(2,2,1)-5-heptene-2,3-dicarboxylic acid) are preferable.

The above-described diol component is formed of at least, one of an aliphatic glycol having 2 to 10 carbon atoms, an alicyclic glycol having 6 to 12 carbon atoms, and a glycol containing an ether bond.

As the aliphatic glycol having 2 to 10 carbon atoms, ethylene glycol, 1,2-propylene glycol, 1,3-propanediol, 1,4-butanethol, 1,5-pentanediol, neopentyl glycol 1,6-hexanediol, 3-methyl-1,5-pentanediol, 1,9-nonanediol, 2-ethyl-2-butylpropanediol, and the like can be used.

As the alicyclic glycol having 6 to 12 carbon atoms, 1,4-73 cyclohexanedimethanol and the like can be used.

As the glycol containing an ether bond, diethylene glycol, triethylene dipropylene glycol, and further, glycols obtained by adding 1 to several moles of ethylene oxide or propylene oxide to each of the two phenolic hydroxy groups of a hisphenol, e.g., 2,2-bis(4-hydroxyethoxy phenyl)propane and the like, can be used. Polyethylene glycol, polypropylene glycol, and polytetramethylene glycol can also be used as necessary.

Besides the above-described &carboxylic acid component and the above-described diol component, a trifunctional or higher-functional polycarboxylic acid and/or polyol can be copolymerized.

As the trifunctional or higher-functional polycarboxylic acid, trimellitic acid (anhydride), pyromellitic acid (anhydride), benzophenone tetracarboxylic acid (anhydride), trimesic acid, ethylene glycol bis(anhydrotrimellitate), glycerol tris(anhydrotrimellitate), and the like can be used.

As the trifunctional or higher-functional polyol, glycerin, trimethylolethane, trimethylolpropane, pentaerythritol, and the like can be used.

The trifunctional or higher-functional polycarboxylic acid and/or polyol can be used within a range of 0 to 5 mol % and preferably 0 to 3 mol % with respect to all polycarboxylic acid components including the above-described &carboxylic acid component or all polyol components including the above-described diol component.

(Graft Moiety of Acrylic Graft Copolymerized Polyester)

The graft moiety of the grafted polyester that can be used in the present invention can be a polymer derived from a monomer mixture containing at least one type of radically polymerizable monomer having a hydrophilic group or a group that can be changed to a hydrophilic group later.

The weight-average molecular weight of the polymer forming the graft moiety is 500 to 50000 and preferably 4000 to 50000. If the weight-average molecular weight is lower than 500, a grafting rate decreases, and thus hydrophilicity imparted to the polyester is not sufficiently. In addition, in general, it is difficult to control the weight-average molecular weight of a graft moiety to be lower than 500. The graft moiety forms a hydration layer of dispersed particles.

It is desirable that the weight-average molecular weight of the graft moiety derived from the radically polymerizable monomer is not lower than 500 in order to form a hydration layer having a sufficient thickness on particles and obtain a stable dispersion. The upper limit of the weight-average molecular weight of the graft moiety of the radically polymerizable monomer is preferably 50000 as described above in terms of polymerizability in solution polymerization. Control of the molecular weight to be within this range can be performed by appropriately selecting a polymerization initiator amount, a monomer dropping time, a polymerization time, a reaction solvent, and a monomer composition and appropriately combining, as necessary, a chain transfer agent or a polymerization inhibitor. The glass transition point of the polymer forming the graft moiety is not higher than 30° C. and preferably not higher than 10° C.

As the hydrophilic group of the radically polymerizable monomer, a carboxyl group, a hydroxy group, a sulfonic acid group, an amide group, a quaternary ammonium salt, a phosphoric acid group, and the like can be used. As the group that can be changed to the hydrophilic group, acid anhydride, glycidyl, chlor, and the like can be used. The dispersibility of the grafted polyester in water can be controlled with the hydrophilic group that is introduced into the polyester by grafting. Among the above-described hydrophilic groups, a carboxyl group allows the introduction amount thereof into the grafted polyester to be accurately determined by using an acid value publicly known in this technical field, and thus is preferable for controlling the dispersibility of the grafted polyester in water.

As the carboxyl-group-containing radically polymerizable monomer, acrylic acid, methacrylic acid, maleic acid, fumaric acid, itaconic acid, citraconic acid, and the like can be used, and furthermore, maleic acid anhydride, itaconic acid anhydride, methacrylic acid anhydride, and the like that easily generate a carboxylic acid by being brought into contact with water/amine, can be used. Preferable carboxyl-group-containing radically polymerizable monomers are acrylic acid anhydride, methacrylic acid anhydride, and maleic acid anhydride.

Besides the above-described hydrophilic-group-containing radically polymerizable monomer, at least one type of radically polymerizable monomer containing no hydrophilic group is preferably copolymerized. With only the hydrophilic-group-containing monomer, grafting to the polyester main chain does not smoothly occur, and it is difficult to obtain a favorable copolymerized polyester water-based dispersion. Highly efficient grafting cannot be performed without copolymerizing at least one type of radically polymerizable monomer containing no hydrophilic group.

As the radically polymerizable monomer containing no hydrophilic group, among monomers that have ethylenic unsaturated bonds and that do not contain the above-described hydrophilic groups, one type is used or a combination of two or more types is used. Examples of this monomer can include: acrylic acid esters such as methyl acrylate, ethyl acrylate, isopropyl acrylate, n-butyl acrylate, 2-ethylhexyl acrylate, 2-hydroxyethyl acrylate, and hydroxypropyl acrylate; methacrylic acid esters such as methyl methacrylate, ethyl methacrylate, isopropyl methacrylate, n-butyl methacrylate, isobutyl methacrylate, n-hexyl methacrylate, methacrylate, 2-hydroxyethyl methacrylate, and hydroxylpropyl methacrylate: acrylic acid derivatives and methacrylic acid derivatives such as acrylamide, N-methylolacrylamide, and diacetone acrylamide; nitriles such as acrylonitrile and methacrylonitrile; vinyl esters such as vinyl acetate, vinyl propionate, and vinyl benzoate; vinyl ethers such as vinyl methyl ether, vinyl ethyl ether, and vinyl isobutyl ether; vinyl ketones such as vinyl methyl ketone, vinyl hexyl ketone, and methyl isopropenyl ketone; N-vinyl compounds such as N-vinylpyrrole, N-vinylcarbazole, N-vinylindole, and N-vinylpyrrolidone; vinyl halides such as vinyl chloride, vinylidene chloride, vinyl bromide, and vinyl fluoride; and aromatic vinyl compounds such as styrene, u-methylstyrene, t-butylstyrene, vinyl toluene, and vinylnaphthalenes. These monomers can be used singly or two or more of the monomers can be used in combination.

The use ratio between the hydrophilic-group-containing monomer and the monomer containing no hydrophilic group is determined in consideration of the amount of the hydrophilic group to be introduced into the grafted polyester, and is ordinarily within a range of 95:5 to 5:95, preferably 90:10 to 10:90, and further preferably 80:20 to 40:60 in terms of mass ratio (hydrophilic-group-containing monomer:monomer containing no hydrophilic group).

In the case of using a carboxyl-group-containing monomer as the hydrophilic-group-containing monomer, the total acid value of the grafted polyester is 600 to 4000 eq./$10^6$ g, preferably 700 to 3000 eq./$10^6$ g, and most preferably 800 to 2500 eq./$10^6$ g. If the acid value is not higher than 600 eq./$10^6$ g, a copolymerized polyester water-based dispersion having a small particle diameter is difficult to be obtained at the time of dispersion of the grafted polyester in water, and further, the dispersion stability of the copolymerized polyester water-based dispersion decreases. Meanwhile, if the acid value is not lower than 4000 eq./$10^6$ g, the water resistance of the easily adhesive layer formed from the copolymerized polyester water-based dispersion is low.

The mass ratio of the polyester main chain to the graft moiety in the acrylic graft copolymerized polyester (polyester:radically polymerizabie monomer) is within a range of 40:60 to 95:5, preferably 55:45 to 93:7, and further preferably 60:40 to 90:10.

If the mass ratio of the polyester main chain is not higher than 40% by mass, excellent performances, i.e., high processability, excellent water resistance, and excellent adhesion to various kinds of base materials, of the already-described base polyester cannot be sufficiently exhibited. On the contrary, undesirable performances, i.e. low processability, glossiness, water resistance, and the like, of the acrylic resin are imparted. Meanwhile, if the mass ratio of the polyester is not lower than 95% by mass, the amount of the hydrophilic group of the graft moiety for imparting hydrophilicity to the grafted polyester is insufficient, and a favorable aqueous dispersion cannot be obtained.

<Crosslinking Agent to be Added to Coating Liquid>

The above-described coating liquid can be used as a coating agent for forming the coating layer as is. However, if a crosslinking agent (curing resin) is further blended and curing is caused, a high level of water resistance can be imparted to the coating layer.

As the crosslinking agent, the following crosslinking agent can be used: a phenol formaldehyde resin of a condensate of formaldehyde and an alkylated phenol, a cresol, or the like; an amino resin such as an adduct of formaldehyde and urea, melamine, benzoguanamine, or the like, or an alkyl ether compound formed of the adduct and an alcohol having 1 to 6 carbon atoms; a polyfunctional epoxy compound; a polyfunctional isocyanate compound; a blocked isocyanate compound; a polyfunctional aziridine compound; an oxazoline compound; or the like.

The coating layer used in the present invention may further contain, within a range that does not cause impairment of the advantageous effects of the present invention, additives such as an antistatic agent, an inorganic lubricant, and an organic lubricant in order to impart antistatic properties and slipperiness. In the case of coating an antistatic agent, an inorganic lubricant, an organic lubricant, and the like on a surface of the film, these additives are preferably contained in the coating layer, to be prevented from separating.

As the method for coating the coating agent on a polyamide film base material in order to form the coating layer, publicly-known coating methods such as a gravure coating method, a reverse coating method, a die coating method, a bar coating method, a dip coating method, and the like can be employed.

The coating amount of the coating agent on the polyamide film having been biaxially oriented is 0.01 to 3 g/m² in terms of solid content. The coating agent is preferably coated such that the coating amount thereof is set to 0.04 to 0.5 g/m². If the coating amount is not higher than 0.01 g/m², a sufficient adhesion strength between the coating layer and the other layer is not obtained. Meanwhile, if the coating amount is not lower than 3 g/m² blocking occurs, and a problem arises in practical use.

The coating layer can be prepared by: coating the coating agent on a biaxially stretched polyamide film base material or coating the coating agent on a polyamide film base material that has not yet been stretched or has been uniaxially stretched; then drying the coating agent; further performing uniaxial stretch or biaxial stretch, as necessary; and thereafter performing heat setting. Regarding the drying temperature after coating of the coating agent, if the drying and the heat setting are performed at not lower than 150° C. and preferably not lower than 200° C., the coating film is stiffened, and the adhesiveness between the easily adhesive layer and the polyamide film base material is improved.

In the case of performing stretch after the coating, the drying after the coating needs to be such that the moisture content of the coating film is controlled to fall within a range of 0.1 to 2% so as to prevent impairment of the stretchability of the coating film. If the drying and the heat setting are performed at not lower than 200° C. after the stretch, the coating film is stiffened, and the adhesiveness between the coating layer and the polyamide film base material is significantly improved.

[Inorganic Thin Film Layer (D)]

Gas barrier properties can be imparted to the biaxially stretched polyamide film of the present invention by providing an inorganic thin film layer on at least one surface of the film.

The inorganic thin film layer according to the embodiment of the present invention and a formation method therefor will be described.

The inorganic thin film layer is a thin film made of metal or an inorganic oxide. The material that forms the inorganic thin film layer is not particularly limited as long as the material can be made into a thin film, but from the viewpoint of transparency and gas barrier properties, an inorganic oxide such as silicon oxide (silica), aluminum oxide (alumina), and a mixture of silicon oxide and aluminum oxide is preferable. From the viewpoint of being able to achieve both flexibility and fineness of the inorganic thin film layer, a composite oxide of silicon oxide and aluminum oxide is particularly preferable. In the composite oxide, as for the mixing ratio of silicon oxide and aluminum oxide, Al is preferably in the range of 20 to 70% by mass in terms of mass ratio of metal content. If the Al concentration is less than 20% by mass, the water vapor barrier property may be decreased. On the other hand, if the Al concentration exceeds 70% by mass, the inorganic thin film layer tends to become hard, and the film may be destroyed during secondary processing such as printing or lamination to decrease the gas barrier properties. Here, the silicon oxide is various silicon oxides such as SiO and $SiO^2$ or mixtures thereof, and the aluminum oxide is various aluminum oxides such as AlO and $Al_2O_3$ and mixtures thereof.

The film thickness of the inorganic thin film layer is usually 1 to 100 nm and preferably 5 to 50 nm. If the film thickness of the inorganic thin film layer is less than 1 nm, it may be difficult to obtain satisfactory gas barrier properties. On the other hand, if the film thickness of the inorganic thin film layer exceeds 100 nm to make the inorganic thin film layer excessively thick, a gas barrier properties improving effect equivalent to this film thickness is not obtained, so that such a film thickness is disadvantageous in terms of bending resistance and production cost.

The method for forming the inorganic thin film layer is not particularly limited, and, a known vapor deposition method, for example, a physical vapor deposition method (PVD method) such as a vacuum vapor deposition method, a sputtering method, and an ion plating method, or a chemical vapor deposition method (CND method), may be adopted as appropriate. Hereinafter, a typical method for forming the inorganic thin film layer will be described with a silicon oxide/aluminum oxide-based thin film as an example. For example, in the case where a vacuum vapor deposition method is adopted, a mixture of $SiO_2$ and $Al2O_3$, a mixture of $SiO_2$ and Al, or the like is preferably used as the vapor deposition raw material. Particles are usually used as these vapor deposition raw materials. In this case, the size of each particle is preferably a size in which the pressure during vapor deposition does not change, and the diameter of each particle is preferably 1 mm to 5 mm. For heating, methods such as resistive heating, high frequency induction heating, electron beam heating, and laser heating can be adopted. It is also possible to adopt reactive vapor deposition in which oxygen, nitrogen, hydrogen, argon, carbon dioxide gas, water vapor, or the like is introduced as a reaction gas or a means such as ozone addition or ion assist is used. Furthermore, film production conditions such as applying a bias to a body to be vapor-deposited. (laminated film to be vapor-deposited) and heating or cooling the body to be vapor-deposited can be arbitrarily changed. Similarly, the vapor deposition materials, reaction gases, application of a bias to the body to be vapor-deposited, heating/cooling, and the like can be changed even when a sputtering method or a CVD method is adopted.

[Laminated Film by Laminating a Sealant Film]

The biaxially stretched poly-amide film of the present invention is made into a laminated film by laminating a sealant film, etc., and then processed into a packing bag. Examples of the sealant film include an unstretched linear low-density polyethylene (LLDPE) film, an unstretched polypropylene (CPP) film, and an ethylene-vinyl alcohol copolymer resin (EVOH) film.

Examples of the layer configuration of the laminated film of the present invention include for example: ONY/adhesive/LLDPE, ONY/adhesive/CPP, ONY/adhesive/Al/adhesive/CPP, ONY/adhesive/Al/adhesive/LLDPE, ONY/PE/Al/adhesive/LLDPE, ONY/adhesive/Al/PE/LLDPE, PET/adhesive/ONY/adhesive/LLDPE, PET/adhesive/ONY/PE/LLDPE, PET/adhesive/ONY/adhesive/Al/adhesive/LLDPE, PET/adhesive/Al/adhesive/ONY/adhesive/LLDPE, PET/adhesive/Al/adhesive/ONY/PE/LLDPE, PET/PE/Al/PE/ONY/PE/LLDPE, PET/adhesive/ONY/adhesive/CPP, PET/adhesive/ONY/adhesive/Al/adhesive/CPP, PET/adhesive/Al/adhesive/ONY/adhesive/CPP, ONY/adhesive/PET/adhesive/LLDPE, ONY/adhesive/PET/PE/LLDPE, ONY/adhesive/PET/adhesive/CPP, ONY/adhesive/Al//PET/adhesive/LLDPE, ONY/adhesive/Al/adhesive/PET/PE/LLDPE, ONY/PE/LLDPE, ONY/PE/CPP, ONY/PE/Al/PE, ONY/PE/Al/PE/LLDPE, OPP/adhesive/ONY/adhesive/LLDPE, ONY/adhesive/EVOH/adhesive/LLDPE, ONY/adhesive/EVOH/adhesive/CPP, ONY/adhesive/ALUMINUM VAPOR, DEPOSITION PET/adhesive/LLDPE, ONY/adhesive/ALUMINUM VAPOR DEPOSITION PET/adhesive/ONY/adhesive/LLDPE, ONY/adhesive/ALUMINUM VAPOR DEPOSITION PET/PE/LLDPE, ONY/PE/ALUMINUM VAPOR DEPOSITION PET/PE/LLDPE, ONY/adhesive/ALUMINUM VAPOR DEPOSITION PET/adhesive/CPP, PET/adhesive/ALUMINUM VAPOR DEPOSITION PET/adhesive/ONY/adhesive/LLDPE, CPP/adhesive/ONY/adhesive/LLDPE, ONY/adhesive/ALUMINUM VAPOR DEPOSITION LLDPE, ONY/adhesive/ALUMINUM VAPOR DEPOSITION CPP, and the like.

The abbreviations used in the above layer configurations are as follows.

The layer boundary is expressed by "/".

ONY: the biaxially stretched polyester film having the coating layer or the biaxially stretched polyamide film PET: stretched polyethylene terephthalate film LLDPE: unstretched linear low density polyethylene film CPP: unstretched polypropylene film OPP: stretched polypropylene film PE: extrusion-laminated or unstretched low density polyethylene film Al: aluminum foil EVOH: ethylene-vinyl alcohol copolymer resin adhesive: adhesive layer that adheres films together ALUMINUM VAPOR DEPOSITION: indicating that aluminum is vapor-deposited.

Examples of the layer configuration of the laminated film in which the biaxially stretched polyimide film of the present invention having the inorganic thin film layer (D) is used include, ONY/inorganic thin film layer/adhesive/CPP, PET/adhesive/ONY/inorganic thin film layer/adhesive/LLDPE, PET/adhesive/ONY/inorganic thin film layer/PE/LLDPE, PET/adhesive/ONY/inorganic thin film layer/adhesive/CPP, ONY/inorganic thin film layer/adhesive/PET/adhesive/LLDPE, ONY/inorganic thin film layer/adhesive/PET/PE/LLDPE, ONY/inorganic thin film layer/adhesive/PET/adhesive/CPP, ONY/inorganic thin film layer/PE/LLDPE, ONY/inorganic thin film layer/PE/CPP, OPP/adhesive/ONY/inorganic thin film layer/adhesive/LLDPE, ONY/inorganic thin film layer/adhesive/EVOH/adhesive/LLDPE, ONY/inorganic thin film layer/adhesive/EVOH/adhesive/CPP, and CPP/adhesive/ONY/inorganic thin film layer/adhesive/LLDPE.

The abbreviations used for the above layer configuration are as follows.

The layer boundary is expressed by "/".

ONY/inorganic thin film: the biaxially stretched poly-amide film having the inorganic thin film layer (D)

PET: a stretched polyethylene terephthalate film

LLDPE: a unstretched linear low-density polyethylene film

CPP: a unstretched polypropylene film

OPP: a stretched polypropylene film

PE: an extruded laminate or unstretched low-density polyethylene film

EVOH: an ethylene-vinyl alcohol copolymer resin adhesive: an adhesive layer for adhering films to each other

EXAMPLES

The present invention is hereinafter described in more detail with reference to Examples, but the present invention is not restricted by the following Examples. Film was evaluated based on the following measurement method. Unless otherwise stated, measurement was carried out in a measurement room in an environment of 23° C. and 65% relative humidity.

(1) Haze Value of Film

Haze was measured with a direct reading haze meter manufactured by Toyo Seiki Seisaku-sho, Ltd. according to JIS-K-7105.

(2) Film Thickness

A film was cut into 10 equal parts in the TD direction (as for a narrow film, the film was cut into equal parts such that a width that allows a measurement of a thickness can be ensured), The 10 films were stacked on top of each other, cut into a 100 mm film in the MD direction, and conditioned in an environment at a temperature of 23° C. and a relative humidity of 65% for 2 hours or longer. A thickness at the center of each sample was measured with a thickness measurement device manufactured by TESTER SANGYO CO., LTD., and the average value of the measurements was used as a thickness.

(3) Measurement of Biomass Degree of Film

The biomass degree of an obtained film was measured with radiocarbon ($C^{14}$) as described in Method B (AMS) of ASTM D6866-16.

(4) Heat Shrinkage Rate of Film

The heat shrinkage rate was measured by the following equation according to the dimensional change test method described in JIS C2318, except that the test temperature was set to 160° C. and the heating time was set to 10 minutes.

Heat shrinkage rate=[(length before treatment−length after treatment)/length before treatment]×100 (%)

(5) Impact Strength of Film

The impact strength was measured using a film impact tester manufactured by Toyo Seiki Seisaku-sho, Ltd. The measured value was converted into a value in terms of 15 μm thickness and represented in J (joule)/15 μm (6) Dynamic Friction Coefficient of Film The dynamic friction coefficient between the outer surfaces of film rolls was evaluated according to JIS-C2151 under the following conditions. The size of a test piece was 130 mm in width and 250 mm in length, and the test speed was 150 min/min.

(7) Piercing Strength of Film

The piercing strength was measured according to "2. Testing methods for strength, etc." in "Standards for food, additives, etc. Chapter III: Apparatus and Containers and Packaging" (Notification. No. 20 of the Ministry of Health and Welfare, 1982) in the Food Hygiene Act. The film was pierced with a needle having a tip diameter of 0.7 mm at a piercing speed of 50 mm/minute, and the strength at the time when the needle penetrated the film was measured and regarded as the piercing strength. The measurement was performed at normal temperature (23° C.), and the value obtained by dividing the obtained piercing strength (unit: N) of the film by the actual thickness of the film was used as piercing strength (unit: N/μm).

(8) Degree of Plane Orientation of Film

A sample was taken from the center position in the transverse direction of the film. The refractive index (nx) in the machine direction of the film and the refractive index (ny) in the transverse direction of the film were measured for the sample by Method A of JIS K 7142-1996 with sodium D-rays as a light source using an Abbe refractometer, and a plane orientation coefficient was calculated by a calculation equation as formula (1).

Plane orientation coefficient($\Delta P$)=($nx$+$ny$)/2−$nz$ (1)

(9) Elastic Modulus of Film

The obtained biaxially stretched polyamide film was allowed to stand for 2 hours in a room adjusted to 23° C. and 50% RH, and then cut into a strip shape having 150 mm (a gauge length: 100 mm) in measurement directions which are the MD and TI) directions of the film and 15 mm in a direction perpendicular to the measurement directions, to obtain a sample. Using a tensile testing machine (AG-1, manufactured by Shimadzu Corporation) having a 1 kN load cell and a sample attached thereto, a tensile test was conducted at a test speed of 200 mm/min. The elastic modulus was calculated from the gradient of the obtained load-elongation curve. The measurement was performed on three samples, and the average value of each sample was calculated.

(10) Bending Pinhole Resistance of Film

The number of bending fatigue pinholes was measured by the following method using a Gelbo flex tester manufactured by Rigaku Kogyo.

A polyester-based adhesive was applied to the film produced in Examples, then a linear low-density polyethylene film (L-LDPE film: L4102, manufactured by Toyobo Co, Ltd.) having a thickness of 40 inn was dry-laminated thereon, and aging was performed in an environment of 40° C. for 3 days to obtain a laminated film. The obtained laminated film was cut into 12 inches×8 inches and made into a cylindrical shape having a diameter of 3.5 inches. One end of the cylindrical film was fixed to the fixed head side of the Gelbo flex tester, the other end was fixed to the movable head side, and the initial gripping interval was set to 7 inches. A bending fatigue was applied 1000 times at a rate of 40 times/min such that a 440 degree twist was applied in the first 3.5 inches of a stroke and a straight horizontal motion was made in the subsequent 2.5 inches of the stroke to complete the entire stroke, and the number of pinholes that occurred in the laminated film was counted. The measurement was performed in an environment of 1° C. The test film was placed on a filter paper (Advantech, No. 50) with the L-LDPE film side thereof being a lower surface, and the four corners thereof were fixed with Sellotape (registered trademark). Ink (ink manufactured by PILOT corporation (product number: INK-350-blue), diluted 5-fold with pure water) was applied on the test film and spread all over the surface of the test film using a rubber roller. After wiping off unnecessary ink, the test film was removed, and the number of ink dots on the filter paper was measured.

(11) Friction Pinhole Resistance of Film

A friction test was performed by the following method using a fastness tester (Toyo Seiki Seisaku-sho, Ltd.), and a pinhole occurrence distance was measured.

A laminated film that was the same as one produced in the above bending pinhole resistance evaluation was folded in four to produce a test sample having sharpened corners, and the test sample was rubbed against the inner surface of a corrugated cardboard using the fastness tester at an amplitude of 25 cm and an amplitude rate of 30 times/min with a weight of 100 g. As the corrugated cardboard, one having 1280×P180×1210 (AF)=(surface material liner×core material×back material liner (type of flute)) was used.

The pinhole occurrence distance was calculated according to the following procedure. The longer the pinhole occurrence distance, the better the friction pinhole resistance.

First, a friction test was performed at an amplitude of 100 times and a distance of 2500 cm. If no pinhole was formed, a friction test was performed with the number of amplitudes increased by 20 times and with the distance increased by 500 cm. In addition, if no pinhole was formed, a friction test was further performed with the number of amplitudes increased by 20 times and with the distance increased by 500 cm. This was repeated, and the distance at which a pinhole was formed was marked with Q and used as level 1. If a pinhole was formed at an amplitude of 100 times and a distance of 2500 cm, a friction test was performed with the number of amplitudes decreased by 20 times and with the distance decreased by 500 cm. In addition, if a pinhole was formed, a friction test was further performed with the number of amplitudes decreased by 20 times and with the distance decreased by 500 cm. This was repeated, and the distance at which no pinhole was formed was marked with P and used as level 1.

Next, as level 2, in the case of being finally P at level 1, a friction test was performed with the number of amplitudes increased by 20 times, and if no pinhole was formed, P was given, and if a pinhole was formed, Q was given. In the case of being finally Q at level 1, a friction test was performed with the number of amplitudes decreased by 20 times, and if no pinhole was formed, P was given, and if a pinhole was formed, Q was given.

Furthermore, as levels 3 to 20, in the case of being P at the previous level, a friction test was performed with the number of amplitudes increased by 20 times, and if no pinhole was formed, P was given, and if a pinhole was formed, Q was given. In the case of being Q at the previous level, a friction test was performed with the number of amplitudes decreased by 20 times, and if no pinhole was formed, P was given, and if a pinhole was formed, Q was given. This was repeated, and P or Q was given to levels 3 to 20.

For example, the results shown in Table 1 were obtained. A method for obtaining the pinhole occurrence distance will be described using Table 1 as an example.

The number of tests at each distance in which P or Q was given was counted.

The distance having the largest number of times of tests was set as a median, and a coefficient was set to zero. If a distance was longer than this distance, the coefficient was set to +1, +2, +3 . . . per 500 cm, and if a distance was shorter than this distance, the coefficient was set to −1, −2, −3 . . . per 500 cm.

The number of tests in which no hole was formed and the number of tests in which a hole was formed were compared for all the tests from levels 1 to 20, and a friction pinhole occurrence distance was calculated by each of equations in the following cases A and B.

A: case where, in all the tests, the number of tests in which no hole was formed is equal to or more than the number of tests in which a hole was formed.

Friction pinhole occurrence distance=median 500×((coefficient×number of tests in which no hole was formed)/number of tests in which no hole was formed)+½)

B: case where, in all the tests, the number of tests in which no hole was formed is less than the number of tests in which a hole was formed.

Friction pinhole occurrence distance=median+500×(Σ(coefficient×number of tests in which hole was formed)/number of tests in which hole was formed)−½)

TABLE 1

| Number of amplitudes | Distance of amplitudes | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A: case where, in all the tests, the number of tests (P) in which no hole was formed is equal to or more than the number of tests (Q) in which a hole was formed. Friction pinhole occurrence distance = median + 500 × (Σ(coefficient × number of tests in which no hole was formed)/number of tests in which no hole was formed) + ½) Friction pinhole occurrence distance = 3500 + 500 × (−4/10 + ½) = 3550 | | | | | | | | | | | | | | | | |
| 180 | 4500 | | | | | | | | | | | | | | | |
| 160 | 4000 | | | | | | | Q | | Q | | | | Q | | |
| 140 | 3500 | | Q | | Q | | P | | P | | Q | | Q | | P | P |
| 120 | 3000 | | | P | | P | | | | | | Q | | P | | |
| 100 | 2500 | | | | | | | | | | | | | | | |
| B: case where, in all the tests, the number of tests (P) in which no hole was formed is less than the number of tests (Q) in which a hole was formed. Friction pinhole occurrence distance = median + 500 × (Σ(coefficient × number of tests in which hole was formed)/number of tests in which hole was formed) − ½) Friction pinhole occurrence distance = 3000 + 500 × (3/11 − ½) = 2886 | | | | | | | | | | | | | | | | |
| 160 | 4000 | | | | | | | | | | | | | | | |
| 140 | 3500 | | | | | | | Q | | Q | | | | Q | | |
| 120 | 3000 | | Q | | Q | | P | | P | | Q | | Q | | P | P |
| 100 | 2500 | | | P | | P | | | | | | | | P | | |
| 80 | 2000 | | | | | | | | | | | | | | | |

TABLE 1-continued

| Number of amplitudes | Distance of amplitudes | 16 | 17 | 18 | 19 | 20 | Number of P | Number of Q | Coefficient | Number * coefficient |
|---|---|---|---|---|---|---|---|---|---|---|
| | A: case where, in all the tests, the number of tests (P) in which no hole was formed is equal to or more than the number of tests (Q) in which a hole was formed. Friction pinhole occurrence distance = median + 500 × (Σ(coefficient × number of tests in which no hole was formed)/number of tests in which no hole was formed) + ½) Friction pinhole occurrence distance = 3500 + 500 × (−4/10 + ½) = 3550 |
| 180 | 4500 |   |   |   |   |   |   |   |   |   |
| 160 | 4000 | Q |   | Q |   | Q | 0 | 6 | 1 | 0 |
| 140 | 3500 |   | P |   | P |   | 6 | 4 | 0 | 0 |
| 120 | 3000 |   |   |   |   |   | 4 | 0 | −1 | −4 |
| 100 | 2500 |   |   |   |   |   |   |   |   |   |
|   |   |   |   |   |   | Total | 10 | 10 | A | −4 |
| | B: case where, in all the tests, the number of tests (P) in which no hole was formed is less than the number of tests (Q) in which a hole was formed. Friction pinhole occurrence distance = median + 500 × (Σ(coefficient × number of tests in which hole was formed)/number of tests in which hole was formed) − ½) Friction pinhole occurrence distance = 3000 + 500 × (3/11 − ½) = 2886 |
| 160 | 4000 |   |   |   |   |   |   |   |   |   |
| 140 | 3500 | Q |   |   |   |   | 0 | 4 | 1 | 4 |
| 120 | 3000 |   | Q |   | Q |   | 4 | 6 | 0 | 0 |
| 100 | 2500 |   |   | P |   | Q | 5 | 1 | −1 | −1 |
| 80 | 2000 |   |   |   |   |   |   |   |   |   |
|   |   |   |   |   |   | Total | 9 | 11 | B | 3 |

(12) Laminate Strength with the Polyethylene-Based Sealant

A laminated film made by a method similar to that described in the description of the bending pinhole resistance evaluation was cut into a strip shape having a width of 15 mm and a length of 200 mm. One end of the laminated film was peeled at the interface between the biaxially stretched polyamide film and the linear low density polyethylene film. The lamination strength was measured 3 times in the MD and TD directions, respectively, using an autograph (manufactured by Shimadzu Corporation) under a condition of a temperature of 23° C., a relative humidity of 50%, a tensile speed of 200 mm/min, and a peeling angle of 90°. The lamination strength was evaluated by the average value of the measurements.

(13) Water-Resistant Lamination Strength (Lamination Strength Under Condition of Water Adhesion)

When measuring the lamination strength in (12), the lamination strength was measured while water was being dropped with a dropper to the peeling interface of the strip-shaped laminated film. The measurement was performed three times in each of the MD direction and the TI direction, and the lamination strength was evaluated by the average value of the measurements.

(13) Generation Cycle of Thermally Deteriorated Matter Generated at Die Lip Outlet After the lip of the die was cleaned, film formation was started, and the time until thermally deteriorated matter was generated at the lip of the die was observed.

A: No thermally deteriorated matter is generated even in film formation for 36 hours or longer, and no foreign matter adheres to the film.

B: Thermally deteriorated matter adheres to the lip of the die between 24 and 36 hours.

C: Thermally deteriorated matter adheres to the lip of the die within 24 hours, and foreign matter is generated in the film.

(14) Relative Viscosity of Raw Material Polyamide

A polyamide solution was prepared by dissolving 0.25 g of polyamide in 96% sulfuric acid in a 25 ml measuring flask so as to have a concentration of 1.0 g/dl, and a relative viscosity was measured at 20° C. using the polyamide solution.

(15) Melting Point of Raw Material Polyamide

Measurement was performed according to JIS K7121 using a SSC5200 type differential scanning calorimeter manufactured by Seiko Instruments Inc., in a nitrogen atmosphere with a sample weight of 10 mg, a heating starting temperature of 30° C., and a temperature rising rate of 20° C./min, to obtain an endothermic peak temperature (Tmp) as a melting point.

Example 1-1

Using a device including two extruders and a co-extruding T-die having a width of 380 mm, lamination was performed in a functional layer (layer abase layer (layer A)/functional layer (layer B) configuration by a feed block method, and melted resins of resin compositions described below were extruded from the T-die into a film shape, and were cast and electrostatically adhered to a cooling roll adjusted to 20° C., to obtain an unstretched film having a thickness of 200 μm.

The resin compositions for the base layer (layer A) and the functional layer (layer B) are as follows.

Resin composition forming base layer (layer A): polyamide resin composition containing 89.5 parts by mass of polyamide 6 (manufactured by Toyobo Co., Ltd., relative viscosity: 2.8, melting point: 220° C.) and 10.5 parts by mass of polybutylene adipate terephthalate (trade name "ECOFLEX", manufactured by BASF, glass transition temperature: −31.3° C., melting point: 120° C.).

Resin composition forming functional layer (layer B): resin composition containing 95 parts by mass of polyamide 6 (manufactured by Toyobo Co., Ltd., relative viscosity: 2.8, melting point: 220° C.), 5.0 parts by mass of polyamide MXD6 (manufactured by MITSUBISHI GAS CHEMICAL COMPANY, INC., relative viscosity: 2.1, melting point: 237° C.); 0.54 parts by mass of porous silica fine particles (manufactured by Fuji Silysia Chemical Ltd., average particle diameter: 2.0 μm, pore volume: 1.6 ml/g), and 0.15 parts by mass of a fatty acid bisamide (ethylene bis stearamide manufactured by Kyoeisha Chemical Co., Ltd.).

The structure of the feed block and the discharge quantities of the extruders were adjusted such that the biaxially stretched poly amide film had a total thickness of 15 μm, the base layer (layer A) had a thickness of 9 μm, and the functional layer (layer B) on each of the front and back sides had a thickness of 3 μm.

The obtained unstretched film was guided to a roll-type stretching machine. The unstretched film was stretched 1.73 times at 80° C. and then further stretched 1.85 times at 70° C. in the MD direction utilizing the difference between the circumferential speeds of rollers. Subsequently, this uniaxially stretched film was guided continuously to a tenter-type stretching machine and preheated at 110° C. Then, the uniaxially stretched film was stretched 1.2 times at 120° C., 1.7 times at 130° C. and 2.0 times at 160° C. in the TD direction, and subjected to a heat setting treatment at 218° C. and then a 7% relaxation treatment at 218° C. Then, corona discharge treatment was performed on the surface on the side on which a linear low-density polyethylene film was to be dry-laminated, to obtain a biaxially stretched polyamide film. The evaluation results of the obtained biaxially stretched film are shown in Table 2.

Examples 1-2 to 1-11

The resin compositions for the base layer (layer A) and the functional layer (layer B) and the film formation conditions such as the heat-setting temperature were changed as in Table 2, and biaxially stretched films were obtained in the same manner as Example 1. The evaluation results of the obtained biaxially stretched films are shown in Table 2.

The following resin was used as each aliphatic or aromatic-aliphatic polyester resin.

PBAT: polybutylene adipate terephthalate (ECOFLEX, manufactured by BASF)

PBS: polybutylene succinate (Bionore 1001, manufactured by Showa Denko K.K.)

PBSA: polybutylene succinate adipate (Bionore 3001, manufactured by Showa Denko K.K.)

PAE: polyamide elastomer (nylon 12/polytetramethylene glycol copolymer, Pehax SA01, manufactured by Arkema)

PEE: maleic anhydride-modified polyester elastomer (TEFABLOC, manufactured by Mitsubishi Chemical Corporation)

In addition, the following resin was used as each polyamide resin in which at least a part of raw material is derived from biomass.

Polyamide 11: (manufactured by Zig Sheng Industrial Co., Ltd., relative viscosity: 2.5, melting point: 186° C., biomass degree: 100%)

Polyamide 410: (ECOPaXX Q150-E, manufactured by DSM, melting point 250° C., biomass degree 70%)

Polyamide 610: (RilsanS SMNO, manufactured by Arkema, melting point: 222° C., biomass degree: 63%)

Polyamide 1010: (RilsanT TMNO, manufactured by Arkema, melting point: 202° C., biomass degree: 100%)

TABLE 2A

| | | unit | Example 1-1 | 1-2 | 1-3 | 1-4 | 1-5 | 1-6 | 1-7 |
|---|---|---|---|---|---|---|---|---|---|
| Layer A | Polyamide 6 | mass by part | 90 | 92 | 92 | 99 | 80 | 90 | 90 |
| Composition | Aliphatic or aromatic- | — | PBAT | PBAT | PBAT | PBAT | PBAT | PBS | PBSA |
| | aliphatic polyester resin | mass by part | 10.5 | 8 | 8 | 1 | 20 | 10 | 10 |
| Layer B | Polyamide 6 | mass by part | 89 | 89 | 89 | 89 | 89 | 89 | 89 |
| Composition | Polyamide MXD6 | mass by part | 10 | 10 | 10 | 10 | 10 | 10 | 10 |
| | Fine particles | mass by part | 0.54 | 0.54 | 0.54 | 0.54 | 0.54 | 0.54 | 0.54 |
| | Fatty acid amide | mass by part | 0.15 | 0.15 | 0.15 | 0.15 | 0.15 | 0.15 | 0.15 |
| Total thickness | | μm | 15 | 15 | 15 | 15 | 15 | 15 | 15 |
| Base layer thickness | | μm | 9 | 9 | 12 | 12 | 12 | 12 | 12 |
| Lamination configuration | | — | B/A/B | B/A/B | B/A/B | B/A/B | B/A/B | B/A/B | B/A/B |
| MD stretching temperature | | ° C. | 80 | 80 | 80 | 80 | 80 | 80 | 80 |
| MD stretch ratio | | — | 3.2 | 3.2 | 3.2 | 3.2 | 3.2 | 3.2 | 3.2 |
| TD stretching temperature | | ° C. | 130 | 130 | 130 | 130 | 130 | 130 | 130 |
| TD stretch ratio | | — | 4.0 | 4.0 | 4.0 | 4.0 | 4.0 | 4.0 | 4.0 |
| TD heat-setting temperature | | ° C. | 218 | 218 | 218 | 218 | 218 | 218 | 218 |
| TD relaxing temperature | | ° C. | 218 | 218 | 218 | 218 | 218 | 218 | 218 |
| TD relaxing rate | | % | 7 | 7 | 7 | 7 | 7 | 7 | 7 |
| Haze | | % | 1.7 | 1.5 | 1.7 | 1.4 | 2.8 | 1.8 | 1.8 |
| Biomass degree | | % | 0.0 | 0.0 | 0.0 | 0.0 | 0.0 | 8.0 | 0.0 |
| Tensile elastic modulus | MD | GPa | 2.5 | 2.3 | 2.4 | 2.7 | 2.2 | 2.5 | 2.5 |
| | TD | GPa | 1.5 | 1.6 | 1.5 | 1.6 | 1.3 | 1.4 | 1.5 |
| Dynamic friction coefficient | | — | 0.60 | 0.60 | 0.60 | 0.70 | 0.60 | 0.50 | 0.60 |
| Impact strength | | J/15 μm | 1.4 | 1.3 | 1.3 | 1.3 | 1.3 | 1.4 | 1.4 |
| Piercing strength | | N/15 μm | 12.0 | 12.0 | 12.4 | 12.5 | 11.5 | 12.1 | 12.2 |
| Plane orientation coefficient | | — | 0.061 | 0.062 | 0.061 | 0.062 | 0.061 | 0.061 | 0.061 |
| Bending pinhole resistance | | piece | 1 | 1 | 1 | 2 | 0 | 1 | 1 |
| Friction pinhole resistance | | cm | 5000 | 5400 | 4200 | 5300 | 3200 | 4800 | 4200 |
| Heat shrinkage rate | MD | % | 1.3 | 1.4 | 1.2 | 1.3 | 1.2 | 1.4 | 1.2 |
| | TD | % | 1.7 | 1.6 | 1.5 | 1.6 | 1.5 | 1.5 | 1.6 |
| Lamination strength | MD | N/mm | 6.0 | 6.4 | 7.0 | 7.4 | 5.8 | 6.1 | 6.0 |
| | TD | N/mm | 5.0 | 6.2 | 6.7 | 6.1 | 4.9 | 5.1 | 5.2 |
| Generation cycle of thermally deteriorated matter | | — | A | A | A | A | A | A | A |

TABLE 2B

|  |  | unit | Example 1-8 | Example 1-9 | Example 1-10 | Example 1-11 |
|---|---|---|---|---|---|---|
| Layer A Composition | Polyamide 6 | mass by part | 75 | 75 | 75 | 75 |
|  | Aliphatic or aromatic-aliphatic polyester resin | — | PBAT | PBAT | PBAT | PBAT |
|  |  | mass by part | 10.5 | 10.5 | 10.5 | 10.5 |
|  | Polyamide 11 | mass by part | 15 | — | — | — |
|  | Polyamide 410 | mass by part | — | 15 | — | — |
|  | Polyamide 610 | mass by part | — | — | 15 | — |
|  | Polyamide 1010 | mass by part | — | — | — | 15 |
| Layer B Composition | Polyamide 6 | mass by part | 89 | 89 | 89 | 89 |
|  | Polyamide MXD6 | mass by part | 10 | 10 | 10 | 10 |
|  | Fine particles | mass by part | 0.54 | 0.54 | 0.54 | 0.54 |
|  | Fatty acid amide | mass by part | 0.15 | 0.15 | 0.15 | 0.15 |
| Total thickness |  | μm | 15 | 15 | 15 | 15 |
| Base layer thickness |  | μm | 12 | 12 | 12 | 12 |
| Lamination configuration |  | — | B/A/B | B/A/B | B/A/B | B/A/B |
| MD stretching temperature |  | ° C. | 80 | 80 | 80 | 80 |
| MD stretch ratio |  | — | 3.2 | 3.2 | 3.2 | 3.2 |
| TD stretching temperature |  | ° C. | 130 | 130 | 130 | 130 |
| TD stretch ratio |  | — | 4.0 | 4.0 | 4.0 | 4.0 |
| TD heat-setting temperature |  | ° C. | 218 | 218 | 218 | 218 |
| TD relaxing temperature |  | ° C. | 218 | 218 | 218 | 218 |
| TD relaxing rate |  | % | 7 | 7 | 7 | 7 |
| Haze |  | % | 2.0 | 2.1 | 1.9 | 2.0 |
| Biomass degree |  | % | 12.0 | 12.0 | 12.0 | 12.0 |
| Tensile elastic modulus | MD | GPa | 2.4 | 2.5 | 2.4 | 2.5 |
|  | TD | GPa | 1.4 | 1.5 | 1.6 | 1.7 |
| Dynamic friction coefficient |  | — | 0.70 | 0.50 | 0.60 | 0.70 |
| Impact strength |  | J/15 μm | 1.4 | 1.4 | 1.3 | 1.4 |
| Piercing strength |  | N/15 μm | 12.5 | 12.3 | 12.2 | 12.3 |
| Plane orientation coefficient |  | — | 0.060 | 0.060 | 0.060 | 0.060 |
| Bending pinhole resistance |  | piece | 0 | 0 | 0 | 0 |
| Friction pinhole resistance |  | cm | 4800 | 5000 | 4900 | 4800 |
| Heat shrinkage rate | MD | % | 1.5 | 1.5 | 1.4 | 1.5 |
|  | TD | % | .1.7 | 1.6 | 1.5 | 1.6 |
| Lamination strength | MD | N/mm | 5.8 | 5.9 | 5.8 | 5.8 |
|  | TD | N/mm | 4.8 | 4.9 | 4.9 | 4.8 |
| Generation cycle of thermally deteriorated matter |  | — | A | A | A | A |

As shown in Table 2, as the film of each Example, a film having both good bending pinhole resistance and good friction pinhole resistance was obtained. In addition, the film had a low haze and good transparency, also had high impact strength and piercing strength, had high lamination strength with a sealant film, and was excellent as a packaging film. Moreover, even in film formation for a long time, deteriorated matter did not adhere to the lip of the die, so that stable film formation was possible.

Comparative Example 1

Biaxially stretched polyamide films were produced in the same manner as Example 1-1 according to the resin compositions and conditions shown in Table 3. The raw materials used for the resin compositions are the same as in Example 1. As for Comparative Example 1-5, a biaxially stretched polyamide film was produced by the following method.

Comparative Example 1-5

Using a device including one extruder and a single-layer T-die having a width of 380 mm, melted resins of resin compositions described below were extruded from the T-die into a film shape, and were cast and electrostatically adhered to a cooling roll adjusted to 20° C., to obtain an unstretched film having a thickness of 180 μm.

Resin composition forming layer: polyamide resin composition containing 97 parts by mass of polyamide 6 (manufactured by Toyobo Co., Ltd., relative viscosity: 2.8, melting point: 220° C.) and 3.0 parts by mass of a maleic anhydride-modified polyester elastomer (PRIMALLOY AP GQ131, manufactured by Mitsubishi Chemical Corporation). 0.09 parts by mass of porous silica fine particles (manufactured by Fuji Silysia Chemical Ltd., average particle diameter: 2.0 μm, pore volume: 1.6 ml/g). 300 ppm of ethylene bis-stearic acid amide.

Next, the obtained unstretched film was longitudinally stretched 3.0 times using a roll stretching machine at 65° C., then transversely stretched 4.0 times using a tenter stretching machine in an atmosphere of 110° C., and further heat-treated in an atmosphere of 210° C. using the same tenter, to prepare a single-layer polyamide-based film having a thickness of 15 μm.

The physical properties and various evaluation results of the biaxially stretched polyamide films produced in Comparative Example 1 are shown in Table 3.

TABLE 3

|  |  | unit | Comparative Example 1-1 | 1-2 | 1-3 | 1-4 | 1-5 |
|---|---|---|---|---|---|---|---|
| Layer A Composition | Polyamide 6 | mass by part | 100 | 70 | 89.5 | 97 | 97 |
|  | Aliphatic or aromatic-aliphatic polyester resin | — | — | PBAT | PBAT | — | PEE |
|  |  | mass by part | — | 30 | 6 | — | 3 |
| Layer B Composition | Polyamide 6 | mass by part | 89 | 89 | 89 | 96 | — |
|  | Polyamide MXD6 | mass by part | 10 | 10 | 10 | 0 | — |
|  | Polyamide elastomer | — | — | — | — | PAE | — |
|  |  | mass by part | — | — | — | 3 | — |
|  | Aliphatic or aromatic-aliphatic polyester resin | — | — | — | PBAT | — | — |
|  |  | mass by part | — | — | 6 | — | — |
|  | Fine particles | mass by part | 0.54 | 0.54 | 0.54 | 0.54 | — |
|  | Fatty acid amide | mass by part | 0.15 | 0.15 | 0.15 | 0.15 | — |
| Total thickness |  | μm | 15 | 15 | 15 | 15 | 15 |
| Base layer thickness |  | μm | 12 | 12 | 12 | 12 | 15 |
| Lamination configuration |  | — | B/A/B | B/A/B | B/A/B | B/A/B | Single Layer |
| MD stretching temperature |  | °C. | 80 | 80 | 80 | 80 | 65 |
| MD stretch ratio |  | — | 3.2 | 3.2 | 3.2 | 3.2 | 3.0 |
| TD stretching temperature |  | °C. | 130 | 130 | 130 | 130 | 110 |
| TD stretch ratio |  | — | 4.0 | 4.0 | 4.0 | 4.0 | 4.0 |
| TD heat-setting temperature |  | °C. | 218 | 218 | 218 | 218 | 210 |
| TD relaxing temperature |  | °C. | 218 | 218 | 218 | 218 | 210 |
| TD relaxing rate |  | % | 7 | 7 | 7 | 7 | 5 |
| Haze |  | % | 1.4 | 4.2 | 2.0 | 1.3 | 3.0 |
| Biomass degree |  | % | 0.0 | 0.0 | 0.0 | 0.0 | 0.0 |
| Tensile elastic modulus | MD | GPa | 2.8 | 1.9 | 2.5 | 2.6 | 2.5 |
|  | TD | GPa | 1.7 | 1.6 | 1.6 | 1.6 | 1.6 |
| Dynamic friction coefficient |  | — | 0.60 | 0.70 | 0.60 | 0.60 | 0.70 |
| Impact strength |  | J/15 μm | 1.3 | 1.0 | 1.3 | 1.3 | 1.3 |
| Piercing strength |  | N/15 μm | 12.5 | 9.2 | 12.0 | 10.0 | 12.9 |
| Plane orientation coefficient |  | — | 0.062 | 0.058 | 0.061 | 0.060 | 0.061 |
| Bending pinhole resistance |  | piece | 18 | 1 | 1 | 2 | 0 |
| Friction pinhole resistance |  | cm | 6000 | 2500 | 2000 | 2500 | 2800 |
| Heat shrinkage rate | MD | % | 1.0 | 1.3 | 1.2 | 1.2 | 1.9 |
|  | TD | % | 1.8 | 1.6 | 1.5 | 1.4 | 2.5 |
| Lamination strength | MD | N/mm | 7.5 | 6.0 | 5.5 | 5.8 | 4.3 |
|  | TD | N/mm | 6.0 | 5.0 | 2.0 | 2.4 | 1.6 |
| Generation cycle of thermally deteriorated matter |  | — | A | A | C | B | C |

As shown in Table 3, the biaxially stretched polyamide film of Comparative Example 1-1 containing no material for improving bending pinhole resistance had inferior bending pinhole resistance. In Comparative Example 1-2, since the amount of the material for improving bending pinhole resistance was excessively large, the bending pinhole resistance was excellent, but the film had a high haze value and also had inferior impact strength, piercing strength, and friction pinhole resistance in Comparative Examples 1-3, 1-4, and 1-5, since the material for improving bending pinhole resistance was also contained on the front layer side, the friction pinhole resistance was inferior. In addition, deteriorated matter adhered to the lip of the die during the extrusion process.

Example 2

Laminated bodies having the following configurations (1) to (9) were produced using the biaxially stretched polyamide film produced in Example 1-1, and three side seal type and pillow type packaging bags were produced using the laminated bodies (1) to (9). As such packaging bags, packaging bags having good appearance and less likely to be torn in a drop impact test were able to be produced (1) Biaxially stretched polyamide film layer/printed layer/polyurethane-based adhesive layer/linear low-density polyethylene film sealant layer (2) Biaxially stretched polyamide film layer/printed layer/polyurethane-based adhesive layer/unstretched polypropylene film sealant layer (3) Biaxially stretched PET film layer/printed layer/polyurethane-based adhesive layer/biaxially stretched polyamide film layer/polyurethane-based adhesive layer/unstretched polypropylene film sealant layer (4) Biaxially stretched PET film layer/printed layer/polyurethane-based adhesive layer/biaxially stretched polyamide film layer/polyurethane-based adhesive layer/linear low-density polyethylene film sealant layer (5) Biaxially stretched polyamide film layer/anchor coat layer/inorganic thin film layer/inorganic thin film protection layer/printed layer/polyurethane-based adhesive layer/linear low-density polyethylene film sealant layer (6) Linear low-density polyethylene film sealant layer/polyurethane-based adhesive layer/biaxially stretched polyamide film layer/anchor coat layer/inorganic thin film layer/polyurethane-based adhesive layer/linear low-density polyethylene film sealant layer (7) Linear low-density polyethylene film layer/polyurethane-based adhesive layer/biaxially stretched polyamide film layer/anchor coat layer/inorganic thin film layer/polyurethane-based adhesive layer/linear low-density polyethylene film layer/low-density polyethylene/paper/low-density polyethylene/linear low-density polyethylene film sealant layer (8) Biaxially stretched polyamide film layer/anchor coat layer/inorganic thin film layer/inorganic thin film protection layer/printed layer/polyurethane-based adhesive layer/unstretched polypropylene film sealant layer (9) Biaxially stretched. PET film layer/inorganic thin film layer/inorganic thin film protection layer/printed layer/polyurethane-based adhesive layer/biaxially stretched polyamide film layer/polyurethane-based adhesive layer/easy-peel-type unstretched polypropylene film sealant layer

[Example 3] Biaxially Stretched Polyamide Films Having Coating Layer

Using a device including two extruders and a co-extruding T-die having a width of 380 mm, resin compositions shown in Table 4 were laminated in a functional layer (layer B)/base layer (layer A)/functional layer (layer B) configuration by a feed block method, and melted resins thereof were extruded from the T-die into a film shape, and were cast and electrostatically adhered to a cooling roll adjusted to 20° C., to obtain an unstretched film having a thickness of 200 μm. The raw materials used for the resin compositions are the same as in Example 1 and Comparative Example 1.

The obtained unstretched film was guided to a roll-type stretching machine. The unstretched film was stretched 1.73 times at 80° C. and then further stretched 1.85 times at 70° C. in the MD direction utilizing the difference between the circumferential speeds of rollers. Subsequently, a coating solution (A) described below was applied to this uniaxially stretched film with a roll coater and then dried with warm air at 70° C. This uniaxially stretched film was guided continuously to a tenter-type stretching machine and preheated at 110° C. Then, the uniaxially stretched film was stretched 1.2 times at 120° C., 1.7 times at 130° C., and 2.0 times at 160° C. in the TD direction, and subjected to a heat setting treatment at 218° C. and then a 7% relaxation treatment at 218° C., Then, corona discharge treatment was performed on the surface on the side on which a linear low-density polyethylene film was to be dry-laminated, to obtain a biaxially stretched polyamide film. However, in Example 3-4, a coating liquid (B): an aqueous dispersion of a polyurethane resin described below, was used as the coating solution.

The physical properties and various evaluation results of the biaxially stretched polyamide films produced in Example 3 are shown in Table 4.

TABLE 4A

| | | unit | Example 3-1 | Example 3-2 | Example 3-3 | Example 3-4 |
|---|---|---|---|---|---|---|
| Layer A Composition | Polyamide 6 | mass by part | 90 | 92 | 92 | 92 |
| | Aliphatic or aromatic-aliphatic polyester resin | — | PBAT | PBAT | PBAT | PBAT |
| | | mass by part | 10 | 8 | 8 | 8 |
| Layer B Composition | Polyamide 6 | mass by part | 89 | 89 | 89 | 89 |
| | Polyamide MXD6 | mass by part | 10 | 10 | 10 | 10 |
| | Fine particles | mass by part | 0.54 | 0.54 | 0.54 | 0.54 |
| | Fatty acid amide | mass by part | 0.15 | 0.15 | 0.15 | 0.15 |
| Total thickness | | μm | 15 | 15 | 15 | 15 |
| Base layer thickness | | μm | 9 | 9 | 12 | 12 |
| Lamination configuration | | — | B/A/B | B/A/B | B/A/B | B/A/B |
| Type of easily adhesive coating layer | | — | A | A | A | B |
| Coating amount of easily adhesive coating layer | | g/m² | 0.3 | 0.3 | 0.3 | 0.3 |
| MD stretching temperature | | ° C. | 80 | 80 | 80 | 80 |
| MD stretch ratio | | — | 3.2 | 3.2 | 3.2 | 3.2 |
| TD stretching temperature | | ° C. | 130 | 130 | 130 | 130 |
| TD stretch ratio | | — | 4.0 | 4.0 | 4.0 | 4.0 |
| TD heat-setting temperature | | ° C. | 218 | 218 | 218 | 218 |
| TD relaxing temperature | | ° C. | 218 | 218 | 218 | 218 |
| TD relaxing rate | | % | 7 | 7 | 7 | 7 |
| Haze | | % | 0.5 | 0.5 | 0.5 | 0.5 |
| Biomass degree | | % | 0.0 | 0.0 | 0.0 | 0.0 |
| Tensile elastic modulus | MD | GPa | 2.5 | 2.3 | 2.4 | 2.4 |
| | TD | GPa | 1.5 | 1.6 | 1.5 | 1.5 |
| Dynamic friction coefficient | | — | 0.70 | 0.66 | 0.67 | 0.66 |
| Impact strength | | J/15 μm | 1.36 | 1.25 | 1.34 | 1.34 |
| Piercing strength | | N/15 μm | 12.0 | 12.0 | 12.4 | 12.4 |
| Plane orientation coefficient | | — | 0.061 | 0.062 | 0.061 | 0.061 |
| Bending pinhole resistance | | piece | 1 | 1 | 1 | 1 |
| Friction pinhole resistance | | cm | 5000 | 5400 | 4200 | 4200 |
| Heat shrinkage rate | MD | % | 1.3 | 1.4 | 1.2 | 1.2 |
| | TD | % | 1.7 | 1.6 | 1.5 | 1.4 |
| Lamination strength | MD | N/mm | 6.0 | 6.4 | 7.0 | 7.2 |
| | TD | N/mm | 5.0 | 6.2 | 6.7 | 6.8 |
| Water-resistant lamination strength | MD | N/mm | 3.4 | 3.3 | 3.1 | 3.0 |
| | TD | N/mm | 3.1 | 2.9 | 3.1 | 2.9 |
| Generation cycle of thermally deteriorated matter | | — | A | A | A | A |

| | | unit | Example 3-5 | Example 3-6 | Example 3-7 | Example 3-8 |
|---|---|---|---|---|---|---|
| Layer A Composition | Polyamide 6 | mass by part | 99 | 80 | 90 | 90 |
| | Aliphatic or aromatic-aliphatic polyester resin | — | PBAT | PBAT | PBS | PBSA |
| | | mass by part | 1 | 20 | 10 | 10 |

TABLE 4A-continued

| | | | | | | |
|---|---|---|---|---|---|---|
| Layer B Composition | Polyamide 6 | mass by part | 89 | 89 | 89 | 89 |
| | Polyamide MXD6 | mass by part | 10 | 10 | 10 | 10 |
| | Fine particles | mass by part | 0.54 | 0.54 | 0.54 | 0.54 |
| | Fatty acid amide | mass by part | 0.15 | 0.15 | 0.15 | 0.15 |
| Total thickness | | μm | 15 | 15 | 15 | 15 |
| Base layer thickness | | μm | 12 | 12 | 12 | 12 |
| Lamination configuration | | — | B/A/B | B/A/B | B/A/B | B/A/B |
| Type of easily adhesive coating layer | | — | A | A | A | A |
| Coating amount of easily adhesive coating layer | | g/m² | 0.3 | 0.3 | 0.3 | 0.3 |
| MD stretching temperature | | °C. | 80 | 80 | 80 | 80 |
| MD stretch ratio | | — | 3.2 | 3.2 | 3.2 | 3.2 |
| TD stretching temperature | | °C. | 130 | 130 | 130 | 130 |
| TD stretch ratio | | — | 4.0 | 4.0 | 4.0 | 4.0 |
| TD heat-setting temperature | | °C. | 218 | 218 | 218 | 218 |
| TD relaxing temperature | | °C. | 218 | 218 | 218 | 218 |
| TD relaxing rate | | % | 7 | 7 | 7 | 7 |
| Haze | | % | 0.5 | 0.5 | 0.5 | 0.5 |
| Biomass degree | | % | 0.0 | 0.0 | 8.0 | 0.0 |
| Tensile elastic modulus | MD | GPa | 2.7 | 2.2 | 2.5 | 2.5 |
| | TD | GPa | 1.6 | 1.3 | 1.4 | 1.5 |
| Dynamic friction coefficient | | — | 0.62 | 0.73 | 0.70 | 0.73 |
| Impact strength | | J/15 μm | 1.33 | 1.28 | 1.35 | 1.36 |
| Piercing strength | | N/15 μm | 12.5 | 11.5 | 12.1 | 12.2 |
| Plane orientation coefficient | | — | 0.062 | 0.061 | 0.061 | 0.061 |
| Bending pinhole resistance | | piece | 2 | 0 | 1 | 1 |
| Friction pinhole resistance | | cm | 5300 | 3200 | 4800 | 4200 |
| Heat shrinkage rate | MD | % | 1.3 | 1.2 | 1.4 | 1.2 |
| | TD | % | 1.6 | 1.5 | 1.5 | 1.6 |
| Lamination strength | MD | N/mm | 7.4 | 5.8 | 6.1 | 6.0 |
| | TD | N/mm | 6.1 | 4.9 | 5.1 | 5.2 |
| Water-resistant lamination strength | MD | N/mm | 3.0 | 3.3 | 3.3 | 3.1 |
| | TD | N/mm | 3.0 | 3.1 | 2.8 | 2.9 |
| Generation cycle of thermally deteriorated matter | | — | A | A | A | A |

TABLE 4B

| | | | Example | | | |
|---|---|---|---|---|---|---|
| | | unit | 3-9 | 3-10 | 3-11 | 3-12 |
| Layer A Composition | Polyamide 6 | mass by part | 75 | 75 | 75 | 75 |
| | Aliphatic or aromatic-aliphatic polyester resin | — | PBAT | PBAT | PBAT | PBAT |
| | | mass by part | 10 | 10 | 10 | 10 |
| | Polyamide 11 | mass by part | 15 | — | — | — |
| | Polyamide 410 | mass by part | — | 15 | — | — |
| | Polyamide 610 | mass by part | — | — | 15 | — |
| | Polyamide 1010 | mass by part | — | — | — | 15 |
| Layer B Composition | Polyamide 6 | mass by part | 89 | 89 | 89 | 89 |
| | Polyamide MXD6 | mass by part | 10 | 10 | 10 | 10 |
| | Fine particles | mass by part | 0.54 | 0.54 | 0.54 | 0.54 |
| | Fatty acid amide | mass by part | 0.15 | 0.15 | 0.15 | 0.15 |
| Total thickness | | μm | 15 | 15 | 15 | 15 |
| Base layer thickness | | μm | 12 | 12 | 12 | 12 |
| Lamination configuration | | — | B/A/B | B/A/B | B/A/B | B/A/B |
| Type of easily adhesive coating layer | | — | A | A | A | A |
| Coating amount of easily adhesive coating layer | | g/m² | 0.3 | 0.3 | 0.3 | 0.3 |
| MD stretching temperature | | °C. | 80 | 80 | 80 | 80 |
| MD stretch ratio | | — | 3.2 | 3.2 | 3.2 | 3.2 |
| TD stretching temperature | | °C. | 130 | 130 | 130 | 130 |
| TD stretch ratio | | — | 4.0 | 4.0 | 4.0 | 4.0 |
| TD heat-setting temperature | | °C. | 218 | 218 | 218 | 218 |
| TD relaxing temperature | | °C. | 218 | 218 | 218 | 218 |
| TD relaxing rate | | % | 7 | 7 | 7 | 7 |
| Haze | | % | 0.5 | 2.6 | 0.5 | 0.5 |
| Biomass degree | | % | 12.0 | 8.4 | 7.6 | 12.0 |
| Tensile elastic modulus | MD | GPa | 2.4 | 2.5 | 2.4 | 2.5 |
| | TD | GPa | 1.4 | 1.5 | 1.6 | 1.7 |
| Dynamic friction coefficient | | — | 0.75 | 0.72 | 0.73 | 0.72 |
| Impact strength | | J/15 μm | 1.38 | 1.36 | 1.33 | 1.35 |
| Piercing strength | | N/15 μm | 12.5 | 12.3 | 12.2 | 12.3 |
| Plane orientation coefficient | | — | 0.060 | 0.060 | 0.060 | 0.060 |
| Bending pinhole resistance | | piece | 0 | 0 | 0 | 0 |
| Friction pinhole resistance | | cm | 4800 | 5000 | 4900 | 4800 |

TABLE 4B-continued

|  |  | unit | Example 3-9 | Example 3-10 | Example 3-11 | Example 3-12 |
|---|---|---|---|---|---|---|
| Heat shrinkage rate | MD | % | 1.5 | 1.5 | 1.4 | 1.5 |
|  | TD | % | 1.7 | 1.6 | 1.5 | 1.6 |
| Lamination strength | MD | N/mm | 5.8 | 5.9 | 5.8 | 5.8 |
|  | TD | N/mm | 4.8 | 4.9 | 4.9 | 4.8 |
| Water-resistant lamination strength | MD | N/mm | 3.0 | 3.1 | 3.3 | 3.1 |
|  | TD | N/mm | 2.9 | 3.0 | 2.9 | 3.1 |
| Generation cycle of thermally deteriorated matter |  | — | A | A | A | A |

As shown in Table 4, as the film of each Example, a film having both good bending pinhole resistance and good friction pinhole resistance was obtained. In addition, the film had a low haze and good transparency, also had high impact strength and piercing strength, had high water-resistant lamination strength with a sealant film, and was excellent as a packaging film. Moreover, even in film formation for a long time, deteriorated matter did not adhere to the lip of the die, so that stable film formation was possible.

Comparative Example 31

Biaxially stretched polyamide films having a coating layer were produced in the same manner as Example 3 according to the resin compositions and conditions shown in Table 5.

As for Comparative Example 3-8, a biaxially stretched polyamide film was produced by the following method.

Using a device including one extruder and a single-layer T-die having a width of 380 mm, melted resins of resin compositions described in Table 5 were extruded from the T-die into a film shape, and were cast and electrostatically adhered to a cooling roll adjusted to 20° C., to obtain an unstretched film having a thickness of 180 μm. Next, the obtained unstretched film was longitudinally stretched 3.0 times in the MD direction using a roll-type stretching machine at 65° C. Subsequently, the coating solution (A) described below was applied to this uniaxially stretched film with a roll coater and then dried with warm air at 70° C. This uniaxially stretched film was guided continuously to a tenter-type stretching machine, transversely stretched 4.0 times using the tenter stretching machine in an atmosphere of 110° C., and further heat-treated in an atmosphere of 210° C. using the same tenter, to produce a single-layer polyamide-based film having a thickness of 15 μm.

Coating Liquid (A): Water-Based Dispersion of Acrylic Graft

Copolymerized Polyester 466 parts by mass of dimethyl terephthalate, 466 parts by mass of dimethyl isophthalate, 401 parts by mass of neopentyl glycol, 443 parts by mass of ethylene glycol, and 0.52 parts by mass of tetra-n-butyl titanate were put into an autoclave made of stainless steel and provided with an agitator, a thermometer, and a partial reflux condenser, and were subjected to a transesterification reaction for four hours at 160 to 220° C. Then, 23 parts by mass of fumaric acid was added and the temperature was increased over one hour from 200° C. to 220° C., to cause an esterification reaction. Then, the temperature was increased to 255° C., the reaction system was gradually decompressed and then reacted while being stirred for one hour and 30 minutes under a reduced pressure of 0.2 mmHg, whereby a polyester was obtained The obtained polyester was transparent pale yellow and had a glass transition temperature of 60° C. and a weight-average molecular weight of 12000. A composition obtained by NMR measurement and the like was as follows.

Dicarboxylic acid components
  Terephthalic acid: 48 mol %
  Isophthalic acid: 48 mol %
  Fumaric acid: 4 mol %
Diol components
  Neopentyl glycol.: 50 mol %
  Ethylene glycol: 50 mol %

75 parts by mass of the above-described polyester resin, 56 parts by mass of methyl ethyl ketone, and 19 parts by mass of isopropyl alcohol were put into a reactor provided with an agitator, a thermometer, a reflux device, and a measure-out dropping device, and were heated and stirred at 65° C., so that the resin was dissolved. After the resin was completely dissolved, a solution obtained by dissolving, in 25 parts by mass of methyl ethyl ketone, 1.2 parts by mass of azobisdimethylvaleronitrile and a mixture of 17.5 parts by mass of methacrylic acid and 7.5 parts by mass of ethyl acrylate was dropped into the polyester solution at 0.2 ml/minute. After the end of the dropping, the resultant solution was further kept stirred for two hours. After a sample (5 g) for analysis was taken from the reaction solution, 300 parts by mass of water and 25 parts by mass of triethylamine were added into the reaction solution, and the reaction solution was stirred for one hour, whereby a grafted polyester dispersion was prepared. Thereafter, the temperature of the obtained dispersion was increased to 100° C. so that methyl ethyl ketone, isopropyl alcohol, and an excess of triethylamine were removed by distillation, whereby a copolymerized polyester water-based dispersion was obtained.

The obtained dispersion was white, had an average particle diameter of 300 nm, and had, at 25° C., a B-type viscosity of 50 centipoises. 1.25 g of heavy water was added to 5 g of the dispersion such that the solid content concentration was set to 20% by mass. Thereafter, DSS was added, and a $^{13}$C-NMR at 1.25 MHz was measured. The width at half maximum of a signal (160 to 175 ppm) of a carbonyl carbon in the polyester main chain was (no signal was detected), and the width at half maximum of a signal (181 to 186 ppm) of a carbonyl carbon of methacrylic acid in the graft moiety was 110 Hz. The solution taken as the sample at the end of the grafting reaction was dried under vacuum for eight hours at 100° C. Then, regarding the solid component of the solution, the acid value was measured, the efficiency of the grafting of the polyester was measured (NMR measurement), and the molecular weight of the graft moiety was measured by means of hydrolysis. The acid value of the solid component was 2300 eq./10$^6$ g. In the $^1$H-NMR measurement, no signal (δ=6.8 to 6.9 ppm, doublet) derived from fumaric acid was detected at all, and this led to the confirmation that the efficiency of the grafting of the polyester was 100%. The molecular weight of the graft moiety was 1.0000 in terms of weight-average molecular weight.

Thereafter, the water-based dispersion which had been obtained as described above was diluted with water such that the solid content concentration was set to 5% by mass, whereby coating liquid (A) was obtained.

Coating Liquid (B): Water-Based Dispersion of Polyurethane Resin

A polyurethane and a water-based dispersion liquid were prepared as follows. A polyester (polyester polyol) having a Tg of −5° C. was obtained by using adipic acid as a dicarboxylic acid component and using, as glycol components, 60 mol % (in the glycol components) of 1,4-butanediol and 40 mol % (in the glycol components) of a propylene oxide (1 mol) adduct of bisphenol A. Toluene diisocyanate was caused to act on the polyester, whereby a urethane polymer was obtained With the urethane polymer as a prepolymer, 1,6-hexanediol was caused to act thereon, to cause chain extension and react aminocarboxylate with ends. Consequently, a water-insoluble and water-dispersible polyurethane was obtained. The polyurethane was dispersed in hot water while the hot water was being stirred, whereby a 25% water-based dispersion liquid was obtained.

The above-described water-based dispersion liquid of the polyurethane was added into and diluted with a mixture liquid containing equal amounts of ion-exchanged water and isopropyl alcohol, such that the solid content was set to 5% by mass. Consequently, coating liquid (B) was obtained.

The physical properties and various evaluation results of the biaxially stretched polyamide films produced in Comparative Example 3 are shown in Table 5.

TABLE 5

| | | | Comparative Example ||||||||
| | | unit | 3-1 | 3-2 | 3-3 | 3-4 | 3-5 | 3-6 | 3-7 | 3-8 |
|---|---|---|---|---|---|---|---|---|---|---|
| Layer A Composition | Polyamide 6 | mass by part | 100 | 99 | 92 | 80 | 70 | 89.5 | 97 | 97 |
| | Aliphatic or aromatic-aliphatic polyester resin | — | — | PBAT | PBAT | PBAT | PBAT | PBAT | — | PEE |
| | | mass by part | — | 1 | 8 | 20 | 30 | 6 | — | 3 |
| Layer B Composition | Polyamide 6 | mass by part | 89 | 89 | 89 | 89 | 89 | 83 | 96 | — |
| | Polyamide MXD6 | mass by part | 10 | 10 | 10 | 10 | 10 | 10 | 0 | — |
| | Polyamide elastomer | — | — | — | — | — | — | — | PAE | — |
| | | mass by part | — | — | — | — | — | — | 3 | — |
| | Aliphatic or aromatic-aliphatic polyester resin | — | — | — | — | — | — | PBAT | — | — |
| | | mass by part | — | — | — | — | — | 6 | — | — |
| | Fine particles | mass by part | 0.54 | 0.54 | 0.54 | 0.54 | 0.54 | 0.54 | 0.54 | — |
| | Fatty acid amide | mass by part | 0.15 | 0.15 | 0.15 | 0.15 | 0.15 | 0.15 | 0.15 | — |
| Total thickness | | μm | 15 | 15 | 15 | 15 | 15 | 15 | 15 | 15 |
| Base layer thickness | | μm | 12 | 12 | 12 | 12 | 12 | 12 | 12 | 15 |
| Lamination configuration | | — | B/A/B | B/A/B | B/A/B | B/A/B | B/A/B | B/A/B | B/A/B | Single Layer |
| Type of easily adhesive coating layer | | — | None | None | None | None | A | A | A | A |
| Coating amount of easily adhesive coating layer | | g/m² | None | None | None | None | 0.3 | 0.3 | 0.3 | 0.3 |
| MD stretching temperature | | ° C. | 80 | 80 | 80 | 80 | 80 | 80 | 80 | 65 |
| MD stretch ratio | | — | 3.2 | 3.2 | 3.2 | 3.2 | 3.2 | 3.2 | 3.2 | 3.0 |
| TD stretching temperature | | ° C. | 130 | 130 | 130 | 130 | 130 | 130 | 130 | 110 |
| TD stretch ratio | | — | 4.0 | 4.0 | 4.0 | 4.0 | 4.0 | 4.0 | 4.0 | 4.0 |
| TD heat-setting temperature | | ° C. | 218 | 218 | 218 | 218 | 218 | 218 | 218 | 210 |
| TD relaxing temperature | | ° C. | 218 | 218 | 218 | 218 | 218 | 218 | 218 | 210 |
| TD relaxing rate | | % | 7 | 7 | 7 | 7 | 7 | 7 | 7 | 5 |
| Haze | | % | 1.4 | 1.4 | 1.7 | 2.8 | 0.5 | 0.5 | 0.5 | 0.5 |
| Biomass degree | | % | 0.0 | 0.0 | 0.0 | 0.0 | 0.0 | 0.0 | 0.0 | 0.0 |
| Tensile elastic modulus | MD | GPa | 2.8 | 2.7 | 2.4 | 2.2 | 1.9 | 2.5 | 2.6 | 2.5 |
| | TD | GPa | 1.7 | 1.6 | 1.5 | 1.3 | 1.6 | 1.6 | 1.6 | 1.6 |
| Dynamic friction coefficient | | — | 0.61 | 0.65 | 0.66 | 0.72 | 0.71 | 0.64 | 0.61 | 0.70 |
| Impact strength | | J/15 μm | 1.33 | 1.30 | 1.34 | 1.28 | 1.00 | 1.22 | 1.30 | 1.28 |
| Piercing strength | | N/15 μm | 12.5 | 12.5 | 12.4 | 11.5 | 9.2 | 12.0 | 10.0 | 12.9 |
| Plane orientation coefficient | | — | 0.062 | 0.062 | 0.061 | 0.061 | 0.058 | 0.061 | 0.060 | 0.061 |
| Bending pinhole resistance | | piece | 18 | 2 | 1 | 0 | 1 | 1 | 2 | 0 |
| Friction pinhole resistance | | cm | 6000 | 5300 | 4200 | 3200 | 2500 | 2000 | 2500 | 2800 |
| Heat shrinkage rate | MD | % | 1.0 | 1.3 | 1.2 | 1.2 | 1.3 | 1.2 | 1.2 | 1.9 |
| | TD | % | 1.8 | 1.6 | 1.5 | 1.5 | 1.6 | 1.5 | 1.4 | 2.5 |
| Lamination strength | MD | N/mm | 7.5 | 7.4 | 7.0 | 5.8 | 6.0 | 5.5 | 5.8 | 1.3 |
| | TD | N/mm | 6.0 | 6.1 | 6.7 | 4.9 | 5.0 | 2.0 | 2.4 | 1.6 |
| Water-resistant lamination strength | MD | N/mm | 1.4 | 1.5 | 1.4 | 1.4 | 3.2 | 3.1 | 3.2 | 3.2 |
| | TD | N/mm | 1.2 | 1.2 | 1.3 | 1.2 | 3.0 | 2.9 | 2.9 | 2.7 |
| Generation cycle of thermally deteriorated matter | | — | A | A | A | A | A | C | B | C |

As shown in Table 5, the biaxially stretched polyamide film of Comparative Example 3-1 containing no material for improving bending pinhole resistance had inferior bending pinhole resistance. In Comparative Example 3-2, since the amount of the material for improving bending pinhole resistance was excessively large, the bending pinhole resistance was excellent, but the film had a high haze value and also had inferior impact strength, piercing strength, and friction pinhole resistance. In Comparative Examples 3-3, 3-4, and 3-5, since the material for improving bending pinhole resistance was also contained on the front layer side, the friction pinhole resistance was inferior. In addition, deteriorated matter adhered to the lip of the die during the extrusion process.

[Example 4] Biaxially Stretched Polyamide Films Having Inorganic Thin Film Layer The resin compositions for the base layer (layer A) and the functional layer (layer B) and the film formation conditions such as the heat-setting temperature were changed as in Table 6, and biaxially stretched films were obtained in the same manner as Example 1-1. The raw materials used for the resin compositions are the same as in Example 1 and Comparative Example 1.

Next, a thin film layer of a composite oxide of silicon dioxide and aluminum oxide was formed on the corona-treated side of the obtained biaxially stretched polyamide film by the following method.

<Formation of Inorganic Thin Film Layer of Composite Oxide ($SiO_2/Al_2O_3$) of Silicon Dioxide and Aluminum Oxide>

An inorganic thin film layer of a composite oxide of silicon dioxide and aluminum oxide was formed on the corona-treated side of the obtained biaxially stretched polyamide film by an electron beam vapor deposition method. In the method of vapor deposition, the film was set on the unwinding side of a continuous vacuum vapor deposition machine and was caused to run through a cooling metal drum to wind the film. At this time, the pressure of the continuous vacuum vapor deposition machine was reduced to $10^{-4}$ Torr or lower, and particulate $SiO_2$ (purity: 99.9%) of about 3 to 5 mm and $Al_2O_3$ (purity: 99.9%) were used as a vapor deposition source in an alumina crucible below the cooling drum. The film thickness of the obtained inorganic thin film layer ($SiO_2/Al_2O_3$ composite oxide layer) was 13 nm. The composition of this composite oxide layer was $SiO_2/Al_2O_3$ (Mass ratio)=60/40.

However, in Example 4-5, an inorganic thin film layer of aluminum oxide was formed as an inorganic thin film layer by the following method.

<Formation of Inorganic Thin Film Layer of Aluminum Oxide ($Al_2O_3$)>

An inorganic thin film layer of aluminum oxide was formed on the corona-treated side of the obtained biaxially stretched polyamide film by an electron beam vapor deposition method. In the method of vapor deposition of aluminum oxide, the film was set on the unwinding side of a continuous vacuum vapor deposition machine and was caused to run through a cooling metal drum to wind the film. At this time, the pressure of the continuous vacuum vapor deposition machine was reduced to $10^{-4}$ Torr or lower, and metal aluminum having a purity of 99.99% was put into an alumina crucible below the cooling drum, was heated and evaporated, and was adhered and deposited on the film while oxygen was supplied into the vapor of the metal aluminum to cause an oxidation reaction, to form an aluminum oxide fain having a thickness of 30 nm.

The physical properties and various evaluation results of the biaxially stretched polyamide films produced in Example 4 are shown in Table 6.

TABLE 6A

| | | | Example | | | | |
|---|---|---|---|---|---|---|---|
| | | unit | 4-1 | 4-2 | 4-3 | 4-4 | 4-5 |
| Layer A Composition | Polyamide 6 | mass by part | 90 | 92 | 92 | 92 | 92 |
| | Aliphatic or aromatic-aliphatic polyester resin | — mass by part | PBAT 10 | PBAT 8 | PBAT 8 | PBAT 8 | PBAT 8 |
| Layer B Composition | Polyamide 6 | mass by part | 89 | 89 | 89 | 89 | 89 |
| | Polyamide MXD6 | mass by part | 10 | 10 | 10 | 10 | 10 |
| | Fine particles | mass by part | 0.54 | 0.54 | 0.54 | 0.54 | 0.54 |
| | Fatty acid amide | mass by part | 0.15 | 0.15 | 0.15 | 0.15 | 0.15 |
| Inorganic thin film layer | | — | aluminum oxide + silicon oxide | aluminum oxide + silicon oxide | aluminum oxide + silicon oxide | aluminum oxide + silicon oxide | aluminum oxide |
| Total thickness | | μm | 15 | 15 | 15 | 15 | 15 |
| Base layer thickness | | μm | 9 | 9 | 12 | 12 | 12 |
| Lamination configuration | | — | B/A/B | B/A/B | B/A/B | B/A/B | B/A/B |
| MD stretching temperature | | °C. | 80 | 80 | 80 | 80 | 80 |
| MD stretch ratio | | — | 3.2 | 3.2 | 3.2 | 3.2 | 3.2 |
| TD stretching temperature | | °C. | 130 | 130 | 130 | 130 | 130 |
| TD stretch ratio | | — | 4.0 | 4.0 | 4.0 | 4.0 | 4.0 |
| TD heat-setting temperature | | °C. | 218 | 218 | 218 | 218 | 218 |
| TD relaxing temperature | | °C. | 218 | 218 | 218 | 218 | 218 |
| TD relaxing rate | | % | 7 | 7 | 7 | 7 | 7 |
| Haze | | % | 0.5 | 0.5 | 0.5 | 0.5 | 0.5 |
| Biomass degree | | % | 0.0 | 0.0 | 0.0 | 0.0 | 0.0 |
| Tensile elastic modulus | MD | GPa | 2.5 | 2.3 | 2.4 | 2.4 | 2.3 |
| | TD | GPa | 1.5 | 1.6 | 1.5 | 1.5 | 1.4 |
| Dynamic friction coefficient | | — | 0.70 | 0.66 | 0.67 | 0.66 | 0.66 |
| Impact strength | | J/15 μm | 1.36 | 1.25 | 1.34 | 1.34 | 1.34 |
| Piercing strength | | N/15 μm | 12.0 | 12.0 | 12.4 | 12.4 | 12.4 |
| Plane orientation coefficient | | — | 0.061 | 0.062 | 0.061 | 0.061 | 0.060 |
| Bending pinhole resistance | | piece | 1 | 1 | 1 | 1 | 1 |

TABLE 6A-continued

| | unit | Example 4-1 | 4-2 | 4-3 | 4-4 | 4-5 |
|---|---|---|---|---|---|---|
| Friction pinhole resistance | cm | 5000 | 5400 | 4200 | 4200 | 4400 |
| Heat shrinkage rate MD | % | 1.3 | 1.4 | 1.2 | 1.2 | 1.1 |
| TD | % | 1.7 | 1.6 | 1.5 | 1.4 | 1.2 |
| Lamination strength MD | N/mm | 6.8 | 6.5 | 6.7 | 6.4 | 6.4 |
| TD | N/mm | 6.5 | 6.4 | 6.5 | 6.5 | 6.5 |
| Oxygen transmission rate | ml/m² · day · MPa | 24.0 | 21.0 | 23.0 | 22.0 | 47.0 |
| Generation cycle of thermally deteriorated matter | — | A | A | A | A | A |

TABLE 6B

| | | unit | Example 4-6 | 4-7 | 4-8 | 4-9 |
|---|---|---|---|---|---|---|
| Layer A Composition | Polyamide 6 | mass by part | 99 | 80 | 90 | 90 |
| | Aliphatic or aromatic-aliphatic polyester resin | — | PBAT | PBAT | PBS | PBSA |
| | | mass by part | 1 | 20 | 10 | 10 |
| Layer B Composition | Polyamide 6 | mass by part | 89 | 89 | 89 | 89 |
| | Polyamide MXD6 | mass by part | 10 | 10 | 10 | 10 |
| | Fine particles | mass by part | 0.54 | 0.54 | 0.54 | 0.54 |
| | Fatty acid amide | mass by part | 0.15 | 0.15 | 0.15 | 0.15 |
| Inorganic thin film layer | | — | aluminum oxide + silicon oxide | aluminum oxide + silicon oxide | aluminum oxide + silicon oxide | aluminum oxide + silicon oxide |
| Total thickness | | μm | 15 | 15 | 15 | 15 |
| Base layer thickness | | μm | 12 | 12 | 12 | 12 |
| Lamination configuration | | — | B/A/B | B/A/B | B/A/B | B/A/B |
| MD stretching temperature | | °C. | 80 | 80 | 80 | 80 |
| MD stretch ratio | | — | 3.2 | 3.2 | 3.2 | 3.2 |
| TD stretching temperature | | °C. | 130 | 130 | 130 | 130 |
| TD stretch ratio | | — | 4.0 | 4.0 | 4.0 | 4.0 |
| TD heat-setting temperature | | °C. | 218 | 218 | 218 | 218 |
| TD relaxing temperature | | °C. | 218 | 218 | 218 | 218 |
| TD relaxing rate | | % | 7 | 7 | 7 | 7 |
| Haze | | % | 0.5 | 0.5 | 0.5 | 0.5 |
| Biomass degree | | % | 0.0 | 0.0 | 8.0 | 0.0 |
| Tensile elastic modulus MD | | GPa | 2.7 | 2.2 | 2.5 | 2.5 |
| TD | | GPa | 1.6 | 1.3 | 1.4 | 1.5 |
| Dynamic friction coefficient | | — | 0.62 | 0.73 | 0.70 | 0.73 |
| Impact strength | | J/15 μm | 1.33 | 1.28 | 1.35 | 1.36 |
| Piercing strength | | N/15 μm | 12.5 | 11.5 | 12.1 | 12.2 |
| Plane orientation coefficient | | — | 0.062 | 0.061 | 0.061 | 0.061 |
| Bending pinhole resistance | | piece | 2 | 0 | 1 | 1 |
| Friction pinhole resistance | | cm | 5300 | 3200 | 4800 | 4200 |
| Heat shrinkage rate MD | | % | 1.3 | 1.2 | 1.4 | 1.2 |
| TD | | % | 1.6 | 1.5 | 1.5 | 1.6 |
| Lamination strength MD | | N/mm | 6.8 | 6.5 | 6.4 | 6.6 |
| TD | | N/mm | 6.3 | 6.3 | 6.5 | 6.5 |
| Oxygen transmission rate | | ml/m² · day · MPa | 23.0 | 24.0 | 27.0 | 23.0 |
| Generation cycle of thermally deteriorated matter | | — | A | A | A | A |

TABLE 6C

| | | unit | Example 4-10 | 4-11 | 4-12 | 4-13 |
|---|---|---|---|---|---|---|
| Layer A Composition | Polyamide 6 | mass by part | 75 | 75 | 75 | 75 |
| | Aliphatic or aromatic-aliphatic polyester resin | — | PBAT | PBAT | PBAT | PBAT |
| | | mass by part | 10 | 10 | 10 | 10 |
| | Polyamide 11 | mass by part | 15 | — | — | — |
| | Polyamide 410 | mass by part | — | 15 | — | — |
| | Polyamide 610 | mass by part | — | — | 15 | — |
| | Polyamide 1010 | mass by part | — | — | — | 15 |

TABLE 6C-continued

|  |  | unit | Example 4-10 | Example 4-11 | Example 4-12 | Example 4-13 |
|---|---|---|---|---|---|---|
| Layer B Composition | Polyamide 6 | mass by part | 89 | 89 | 89 | 89 |
|  | Polyamide MXD6 | mass by part | 10 | 10 | 10 | 10 |
|  | Fine particles | mass by part | 0.54 | 0.54 | 0.54 | 0.54 |
|  | Fatty acid amide | mass by part | 0.15 | 0.15 | 0.15 | 0.15 |
| Inorganic thin film layer |  | — | aluminum oxide + silicon oxide | aluminum oxide + silicon oxide | aluminum oxide + silicon oxide | aluminum oxide + silicon oxide |
| Total thickness |  | μm | 15 | 15 | 15 | 15 |
| Base layer thickness |  | μm | 12 | 12 | 12 | 12 |
| Lamination configuration |  | — | B/A/B | B/A/B | B/A/B | B/A/B |
| MD stretching temperature |  | °C. | 80 | 80 | 80 | 80 |
| MD stretch ratio |  | — | 3.2 | 3.2 | 3.2 | 3.2 |
| TD stretching temperature |  | °C. | 130 | 130 | 130 | 130 |
| TD stretch ratio |  | — | 4.0 | 4.0 | 4.0 | 4.0 |
| TD heat setting temperature |  | °C. | 218 | 218 | 218 | 218 |
| TD relaxing temperature |  | °C. | 218 | 218 | 218 | 218 |
| TD relaxing rate |  | % | 7 | 7 | 7 | 7 |
| Haze |  | % | 0.5 | 2.6 | 0.5 | 0.5 |
| Biomass degree |  | % | 12.0 | 8.4 | 7.6 | 12.0 |
| Tensile elastic modulus | MD | GPa | 2.4 | 2.5 | 2.4 | 2.5 |
|  | TD | GPa | 1.4 | 1.5 | 1.6 | 1.7 |
| Dynamic friction coefficient |  | — | 0.75 | 0.72 | 0.73 | 0.72 |
| Impact strength |  | J/15 μm | 1.38 | 1.36 | 1.33 | 1.35 |
| Piercing strength |  | N/15 μm | 12.5 | 12.3 | 12.2 | 12.3 |
| Plane orientation coefficient |  | — | 0.060 | 0.060 | 0.060 | 0.060 |
| Bending pinhole resistance |  | piece | 0 | 0 | 0 | 0 |
| Friction pinhole resistance |  | cm | 4800 | 5000 | 4900 | 4800 |
| Heat shrinkage rate | MD | % | 1.5 | 1.5 | 1.4 | 1.5 |
|  | TD | % | .1.7 | 1.6 | 1.5 | 1.6 |
| Lamination strength | MD | N/mm | 6.4 | 6.1 | 6.4 | 6.5 |
|  | TD | N/mm | 6.3 | 6.2 | 6.3 | 6.4 |
| Oxygen transmission rate |  | ml/m² · day · MPa | 24.0 | 21.0 | 24.0 | 22.0 |
| Generation cycle of thermally deteriorated matter |  | — | A | A | A | A |

As shown in Table 6, as the film of each Example, a film having both good bending pinhole resistance and good friction pinhole resistance was obtained In addition, the obtained film had a low haze and good transparency, and had high gas barrier properties. Moreover, the film also had high impact strength and piercing strength and was excellent as a packaging film. Moreover, even in film formation for a long time, deteriorated matter did not adhere to the lip of the die, so that stable film formation was possible.

Comparative Example 4

The resin compositions for the base layer (layer Al and the functional layer Gayer B) and the film formation conditions such as the heat-setting temperature were changed as in Table 7, and biaxially stretched films were obtained in the same manner as Comparative Example 1. Next, a thin film layer of the composite oxide of silicon dioxide and aluminum oxide was formed on the corona-treated side of the obtained biaxially stretched polyamide film. In Comparative Example 4-3, formation of an inorganic thin film layer was not performed.

The physical properties and various evaluation results of the biaxially stretched polyamide films produced in Comparative Example 4 are shown in Table 7.

TABLE 7

|  |  |  | unit | Comparative Example 4-1 | 4-2 | 4-3 | 4-4 | 4-5 | 4-6 | 4-7 |
|---|---|---|---|---|---|---|---|---|---|---|
| Layer A Composition | Polyamide 6 |  | mass by part | 100 | 99.5 | 92 | 70 | 89.5 | 97 | 97 |
|  | Aliphatic or aromatic-aliphatic polyester resin |  | — | — | PBAT | PBAT | PBAT | PBAT | PAE | PEE |
|  |  |  | mass by part | — | 0.5 | 8 | 30 | 6 | 3 | 3 |
| Layer B Composition | Polyamide 6 |  | mass by part | 89 | 89 | 89 | 89 | 83 | 96 | — |
|  | Polyamide MXD6 |  | mass by part | 10 | 10 | 10 | 10 | 10 | 0 | — |
|  | Polyamide elastomer | Type | — | — | — | — | — | — | PAE | — |
|  |  | addition amount | mass by part | — | — | — | — | — | 3 | — |
|  | Polyester elastomer | Type | — | — | — | — | — | — | PBAT | — |
|  |  | addition amount | mass by part | — | — | — | — | — | 6 | — |
|  | Fine particles |  | mass by part | 0.54 | 0.54 | 0.54 | 0.54 | 0.54 | 0.54 | — |
|  | Fatty acid amide |  | mass by part | 0.15 | 0.15 | 0.15 | 0.15 | 0.15 | 0.15 | — |

TABLE 7-continued

| | unit | Comparative Example | | | | | | |
| --- | --- | --- | --- | --- | --- | --- | --- | --- |
| | | 4-1 | 4-2 | 4-3 | 4-4 | 4-5 | 4-6 | 4-7 |
| Inorganic thin film layer | — | aluminum oxide + silicon oxide | aluminum oxide + silicon oxide | None | aluminum oxide + silicon oxide | aluminum oxide + silicon oxide | aluminum oxide + silicon oxide | aluminum oxide + silicon oxide |
| Total thickness | μm | 15 | 15 | 15 | 15 | 15 | 15 | 15 |
| Base layer thickness | μm | 12 | 12 | 12 | 12 | 12 | 12 | 15 |
| Lamination configuration | — | B/A/B | B/A/B | B/A/B | B/A/B | B/A/B | B/A/B | Single Layer |
| MD stretching temperature | °C. | 80 | 80 | 80 | 80 | 80 | 80 | 65 |
| MD stretch ratio | — | 3.2 | 3.2 | 3.2 | 3.2 | 3.2 | 3.2 | 3.0 |
| TD stretching temperature | °C. | 130 | 130 | 130 | 130 | 130 | 130 | 110 |
| TD stretch ratio | — | 4.0 | 4.0 | 4.0 | 4.0 | 4.0 | 4.0 | 4.0 |
| TD heat setting temperature | °C. | 218 | 218 | 218 | 218 | 218 | 218 | 210 |
| TD relaxing temperature | °C. | 218 | 218 | 218 | 218 | 218 | 218 | 210 |
| TD relaxing rate | % | 7 | 7 | 7 | 7 | 7 | 7 | 5 |
| Haze | % | 1.4 | 1.4 | 1.7 | 0.5 | 0.5 | 0.5 | 0.5 |
| Biomass degree | % | 0.0 | 0.0 | 0.0 | 0.0 | 0.0 | 0.0 | 0.0 |
| Tensile elastic modulus MD | GPa | 2.8 | 2.7 | 2.4 | 1.9 | 2.5 | 2.6 | 2.5 |
| TD | GPa | 1.7 | 1.6 | 1.5 | 1.6 | 1.6 | 1.6 | 1.6 |
| Dynamic friction coefficient | — | 0.61 | 0.65 | 0.66 | 0.71 | 0.64 | 0.61 | 0.70 |
| Impact strength | J/15 μm | 1.33 | 1.30 | 1.34 | 1.00 | 1.22 | 1.30 | 1.28 |
| Piercing strength | N/15 μm | 12.5 | 12.5 | 12.4 | 9.2 | 12.0 | 10.0 | 12.9 |
| Plane orientation coefficient | — | 0.062 | 0.062 | 0.061 | 0.058 | 0.061 | 0.060 | 0.061 |
| Bending pinhole resistance | piece | 18 | 2 | 1 | 1 | 1 | 2 | 2 |
| Friction pinhole resistance | cm | 6000 | 5300 | 4200 | 2500 | 2000 | 2500 | 2800 |
| Heat shrinkage rate MD | % | 1.0 | 1.3 | 1.2 | 1.3 | 1.2 | 1.2 | 1.9 |
| TD | % | 1.8 | 1.6 | 1.5 | 1.6 | 1.5 | 1.4 | 2.5 |
| Lamination strength MD | N/mm | 6.7 | 6.5 | 6.9 | 6.0 | 5.5 | 5.8 | 4.3 |
| TD | N/mm | 6.5 | 6.4 | 6.7 | 5.0 | 2.0 | 2.4 | 1.6 |
| Oxygen transmission rate | ml/m$^2$ · day · MPa | 21.0 | 24.0 | >500 | 24.0 | 23.0 | 25.0 | 24.0 |
| Generation cycle of thermally deteriorated matter | — | A | A | A | A | C | B | C |

As shown in Table 7, the biaxially stretched polyamide film of Comparative Example 4-1 containing no material for improving bending pinhole resistance had inferior bending pinhole resistance. In Comparative Example 4-2, since the amount of the material for improving bending pinhole resistance was excessively small, the film had inferior bending pinhole resistance. In Comparative Example 4-3, since formation of an inorganic thin film layer was not performed, the film had high oxygen permeability and was not suitable as a gas-barrier film. In Comparative Example 4-4, since the amount of the material for improving bending pinhole resistance was excessively large, the bending pinhole resistance was excellent, but the film had inferior impact strength, piercing strength, and friction pinhole resistance. In Comparative Example 4-5, since the functional layer that was the front layer contained the material for improving bending pinhole resistance, the friction pinhole resistance was inferior. In addition, deteriorated matter adhered to the lip of the die during the extrusion process. In Comparative Examples 4-6 and 4-7, since the polyamide elastomer and the polyester elastomer which are conventionally used as a material for improving bending pinhole resistance were used, the bending pinhole resistance was excellent, but the films had inferior impact strength, piercing strength, and friction pinhole resistance.

INDUSTRIAL APPLICABILITY

Since the biaxially stretched polyamide film of the present invention has excellent impact resistance, bending pinhole resistance, and friction pinhole resistance at the same time, the biaxially stretched polyamide film is suitable for use for packaging materials such as food packaging. Furthermore, since the elastomer component; does not deteriorate inside the die, adhesion of deteriorated matter to the inner surface of the die and adhesion of gum-like matter to the lip outlet of the die can be suppressed over a long time, and the frequency of stopping the production and cleaning the lip of the die can be reduced, so that continuous production for a long time can be enabled.

DESCRIPTION OF THE REFERENCE CHARACTERS

1 head of fastness tester
2 corrugated cardboard.
3 mount for holding sample
4 film sample folded in four
5 rubbing amplitude direction

The invention claimed is:

1. A biaxially stretched polyamide film comprising a functional layer (layer B) laminated on at least one surface of a base layer (layer A), wherein
   the base layer (layer A) consists of, as a resin, (a) 70 to 99% by mass of a polyamide 6 resin, (b) 1 to 20% by mass of an aliphatic or aromatic-aliphatic polyester resin, and (c) optionally a polyamide resin other than the polyamide 6 resin,
   the polyamide resin other than the polyamide 6 resin, when present, is a polyamide resin selected from a polyamide 11 resin, a polyamide 410 resin, a polyamide 610 resin, a polyamide 1010 resin, a polyamide 12 resin, a polyamide 66 resin, a polyamide 6/12 copolymer resin, a polyamide 6/66 copolymer resin, a polyamide MXD6 resin, a polyamide MXD10 resin, and a polyamide 11/6T copolymer resin, and
   the functional layer (layer B) contains at least 70% by mass or more of a polyamide 6 resin.

2. The biaxially stretched polyamide film according to claim 1, wherein the aliphatic or aromatic-aliphatic polyester resin (b) is at least one polyester resin selected from the group consisting of polybutylene succinate, polybutylene succinate adipate, and polybutylene adipate terephthalate.

3. The biaxially stretched polyamide film according to claim 1, wherein the biaxially stretched polyamide film satisfies the following (i) to (iii):
  (i) the number of bending fatigue pinholes is not larger than 5 when a bending test using a Gelbo flex tester is performed 1000 times at a temperature of 1° C.,
  (ii) a distance to occurrence of a pinhole in a friction pinhole resistance test is not smaller than 2900 cm, and
  (iii) the film has a piercing strength of not lower than 0.67 N/µm.

4. A biaxially stretched polyamide film comprising a coating layer on at least one surface of the biaxially stretched polyamide film according to claim 1, wherein the coating layer has a solid content of 0.01 to 3 g/m², and contains one or more resins selected from the group consisting of a polyester resin, a polyurethane resin, a polyacrylic resin, and an acrylic graft copolymerized polyester resin.

5. A laminated film in which a sealant film is laminated on the biaxially stretched polyamide film according to claim 1.

6. The biaxially stretched polyamide film according to claim 1, wherein the base layer (layer A) contains a polyamide resin in which at least a part of raw material is derived from biomass.

7. The biaxially stretched polyamide film according to claim 6, wherein the polyamide resin in which at least a part of the raw material is derived from biomass is at least one polyamide resin selected from the group consisting of polyamide 11, polyamide 410, polyamide 610, and polyamide 1010.

8. A polyamide film comprising an inorganic thin film layer on at least one surface of the biaxially stretched polyamide film according to claim 1.

9. A packaging bag for which the laminated film according to claim 5 is used.

* * * * *